(12) United States Patent
Fujisawa et al.

(10) Patent No.: US 11,762,496 B2
(45) Date of Patent: Sep. 19, 2023

(54) DISPLAY DEVICE AND TOUCH PANEL

(71) Applicant: Japan Display Inc., Tokyo (JP)

(72) Inventors: Akihiko Fujisawa, Tokyo (JP); Daichi Abe, Tokyo (JP); Kaoru Ito, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/674,517

(22) Filed: Feb. 17, 2022

(65) Prior Publication Data

US 2022/0171516 A1 Jun. 2, 2022

Related U.S. Application Data

(63) Continuation of application No. 17/217,058, filed on Mar. 30, 2021, now Pat. No. 11,262,867.

(30) Foreign Application Priority Data

Mar. 30, 2020 (JP) .................................. 2020-059621

(51) Int. Cl.
*G06F 3/041* (2006.01)
*G06F 3/044* (2006.01)
*G06V 40/13* (2022.01)

(52) U.S. Cl.
CPC ........ *G06F 3/04164* (2019.05); *G06F 3/0418* (2013.01); *G06F 3/0446* (2019.05); *G06F 3/04166* (2019.05); *G06V 40/1306* (2022.01)

(58) Field of Classification Search
CPC ............. G06F 3/04164; G06F 3/04166; G06F 3/0446; G06V 40/1306
See application file for complete search history.

(56) References Cited

U.S. PATENT DOCUMENTS

| | | | |
|---|---|---|---|
| 10,845,910 B1* | 11/2020 | Lin ..................... | G06F 3/04166 |
| 2016/0313860 A1 | 10/2016 | Ono et al. | |
| 2017/0286739 A1* | 10/2017 | Shibano ............. | G06V 40/1306 |
| 2017/0336909 A1* | 11/2017 | Song ................... | G06F 3/04166 |
| 2018/0335880 A1* | 11/2018 | Seol .................... | G06F 3/04817 |
| 2020/0104027 A1 | 4/2020 | Gourevitch et al. | |
| 2020/0225789 A1* | 7/2020 | Akimoto ............. | G06V 40/1306 |

FOREIGN PATENT DOCUMENTS

JP 2016206867 A 12/2016

* cited by examiner

*Primary Examiner* — Priyank J Shah

(74) *Attorney, Agent, or Firm* — K&L Gates LLP

(57) ABSTRACT

A technology which can improve the accuracy of touch detection is proposed. A display device includes: a touch panel including plural drive electrodes and plural detection electrodes; plural peripheral wirings; and plural switching elements each of which is disposed between a detection electrode and the corresponding peripheral wiring and that is connected to the detection electrode and the corresponding peripheral electrode. The touch panel executes detection by means of a mutual detection scheme using the plural drive electrodes and the plural detection electrodes. In a condition in which a predefined voltage is applied to the peripheral wirings when the plural switching elements are in an off-state, the voltages of the drive electrodes are changed, and subsequently a condition in which the changes of the voltages of the drive electrodes can be detected from the peripheral wirings is set, and the switching elements are turned from off to on.

14 Claims, 15 Drawing Sheets

AFE

DISPLAY DEVICE AND TOUCH PANEL

CROSS REFERENCE TO RELATED APPLICATIONS

The present application is a continuation of U.S. patent application Ser. No. 17/217,058, filed Mar. 30, 2021, which claims priority from Japanese Patent Application JP 2020-059621, filed on Mar. 30, 2020, the content of which is hereby incorporated by reference into this application.

BACKGROUND OF THE INVENTION

The present disclosure relates to display devices and touch panels.

There are not a few cases where a touch panel is provided in a display device used for a cellular phone or the like. A touch panel includes plural drive electrodes, plural detection electrodes, and plural lead wirings connected to the plural detection electrodes. There is a mutual capacitance detection scheme (mutual detection scheme) in which the position coordinate of a touched position is specified by detecting the changes of electric fields between the plural drive electrodes and the plural detection electrodes, in other words, by detecting the changes of mutual capacitances.

As a display device having a touch panel, there is a display device proposed in Japanese Unexamined Patent Application Publication No. 2016-206867, for example.

SUMMARY OF THE INVENTION

In some cases, fringe electric fields are generated between the outermost drive electrodes of plural drive wirings and plural lead wirings (peripheral wirings). It has been found that, if any of these fringe electric fields is shielded by a conductive object such as a finger, a touch noise is generated, and touch false detection occurs.

An object of the present disclosure is to propose a technology which can improve the accuracy of touch detection.

Problems other than the above and new features will be explicitly shown by the descriptions of this specification and the accompanying drawings.

The outline of a typical display device and a typical touch panel among display devices or touch panels according to this invention can briefly be described as follows.

To put it concretely, a display device according to an embodiment includes:

a touch panel including plural drive electrodes and plural detection electrodes;

plural peripheral wirings; and plural switching elements each of which is disposed between a detection electrode and the corresponding peripheral wiring and that is connected to the detection electrode and the corresponding peripheral electrode, wherein the touch panel executes detection by a mutual detection scheme using the plural drive electrodes and the plural detection electrodes, and in a condition in which a predefined voltage is applied to the peripheral wirings when the plural switching elements are in an off-state, the voltages of the plural drive electrodes are changed, and subsequently a condition in which the changes of the voltages of the plural drive electrodes can be detected from the peripheral wirings is set, and the plural switching elements are turned from off to on.

In addition, a touch panel according to the embodiment includes:

plural drive electrodes;

plural detection electrodes;

plural peripheral wrings; and plural switching elements each of which is disposed between a detection electrode and the corresponding peripheral wiring and that is connected to the detection electrode and the corresponding peripheral electrode, wherein detection is executed by a mutual detection scheme using the plural drive electrodes and the plural detection electrodes, and in a condition in which a predefined voltage is applied to a peripheral wiring connected to a detection electrode to be used for detection when the plural switching elements are in an off-state, the voltages of the plural drive electrodes are changed, and subsequently the switching elements are turned from off to on.

DETAILED DESCRIPTION OF THE PREFERRED EMBODIMENTS

Figure 1:
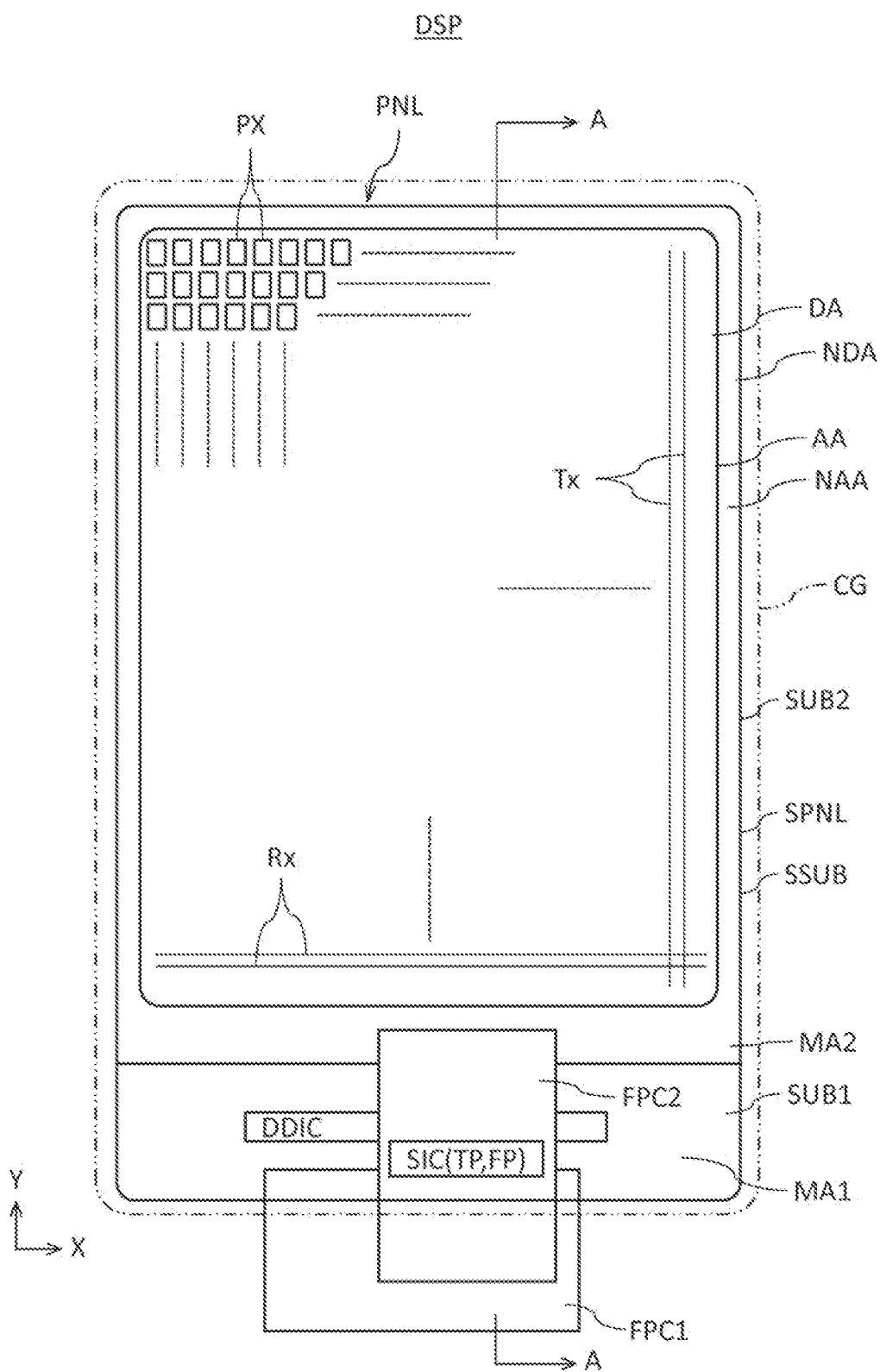
FIG. 1 is a plan view conceptually showing the external view of a display device according to an embodiment.

Hereinafter an embodiment and a comparative example of the present invention will be explained with reference to the accompanying drawings.

Here, the following disclosure is only an example, and it goes without saying that various modifications that may be made accordingly by those skilled in the art without deviating from the gist of the present invention fall within the scope of the present invention. Furthermore, there are some cases where, in the accompanying drawings, the widths, thicknesses, shapes, and the like of respective portions of the embodiment are schematically depicted differently from what they really are for clarifying the following descriptions, but these depictions are only examples, so that the interpretation of the present invention is not limited by these depictions.

In addition, in this specification and the accompanying drawings, there are some cases where the same components as components that have appeared in already-described drawings are given the same reference signs, and detailed explanations about them may be omitted accordingly.

In this embodiment, as an example of a display device, a liquid crystal display device will be disclosed. This liquid crystal display device can be used for various devices such as a smart phone, a tablet terminal, a cellular phone, a personal computer, a TV receiver, an in-vehicle device, a game machine, for example.

Here, in the scopes of the present specification and the appended claims, a term such as "upper", "lower", or the like represents the relative positional relation of a targeted structure to another structure. To put it concretely, when the side of the targeted structure is looked at, a direction from a first substrate (an array substrate) to a second substrate (an opposite substrate) is defined as an "upper" direction and an opposite direction thereto is defined as a "lower" direction.

Furthermore, terms such as "inner" and "outer" represent relative positional relations of two portions on the basis of a display region. In other words, an "inner" portion indicates one portion nearer to the display region than the other portion, and an "outer" portion indicates one portion farther from the display region than the other portion. Here, the definitions of the terms "inner" and "outer" should be made under the condition that the corresponding liquid crystal display device is not folded into two.

A "display device" indicates a general display device that displays videos using a display panel. The "display panel" indicates a structure that displays videos using an electrooptic layer. For example, a term display panel indicates a display cell including an electrooptic layer in some cases, or indicates a structure in which other optical materials (for example, a polarizing material, a backlight, a touch panel, and the like) are mounted in other cases instead of the display cell. Here, the "electrooptic layer" can include a liquid crystal layer, an electrochromic (EC) layer, a micro LED, and the like as long as no technological problem occurs. Therefore, just because a liquid crystal panel including a liquid crystal layer will be explained as an example of a display panel in the after-mentioned embodiment, does not mean that the after-mentioned embodiment is not applicable to a display panel including any of the abovementioned electrooptic layer other than the liquid crystal layer.

Embodiment

Entire Configuration Example of Display Device

FIG. 1 is a plan view conceptually showing the external view of a display device according to an embodiment. A display device DSP includes: a cover glass CG; a display panel PNL; a sensor panel SPNL; a flexible printed circuit board FPC1; a display drive IC chip DDIC; a flexible printed circuit board FPC2; and a sensor IC chip SIC. The sensor panel SPNL can be renamed to a touch panel.

Figure 3:
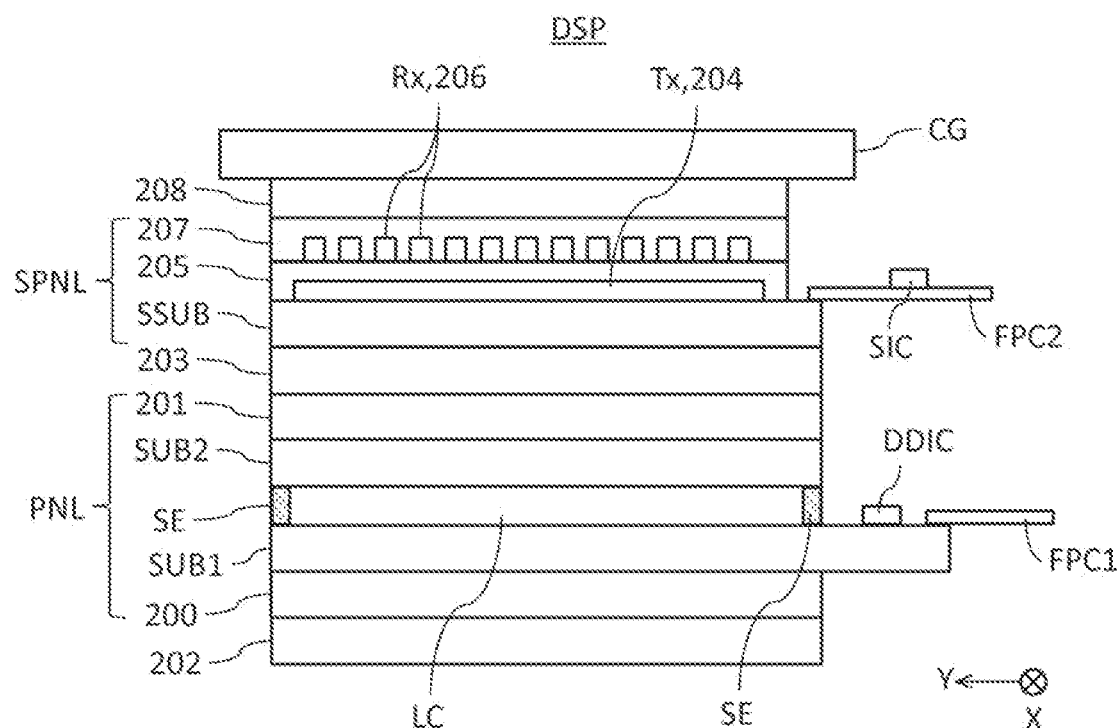
FIG. 3 is a diagram conceptually showing the cross-sectional view of the display device taken along the line A-A of FIG. 1.

The display panel PNL includes: a first substrate (also referred to as an array substrate) SUB1; a second substrate (also referred to as an opposite substrate) SUB2; an after-mentioned liquid crystal layer LC; and an after-mentioned seal member SE. The second substrate SUB2 faces the first substrate SUB1. The first substrate SUB1 includes a mounting section (a mounting area) MA1 that extends to the second direction Y more extensively than the second substrate SUB2 is. The seal member SE, which will be illustrated in the after-mentioned FIG. 3, is located in a non-display section (a non-display area) NDA and seals the liquid crystal layer LC while bonding the first substrate SUB1 and the second substrate SUB2 together. It is conceivable that a lower polarizing plate and a backlight device are mounted on the lower surface of the first substrate SUB1.

The mounting section MA1 is connected to one end of the flexible printed circuit board FPC1, and a printed circuit board (not shown), on which a host device is mounted, is connected to the other end of the flexible printed circuit board FPC1. In this example, the display drive IC chip DDIC is mounted on the mounting section MA1. It is also conceivable that the display drive IC chip DDIC is mounted on the flexible printed circuit board FPC1. The display drive IC chip DDIC outputs a signal necessary for displaying videos to the display panel PNL in a display mode in which videos are displayed.

One end of the flexible printed circuit board FPC2 is connected to a mounting section MA2 of the sensor panel SPNL. In this example, the sensor IC chip SIC is mounted on the flexible printed circuit board FPC2. The sensor IC chip SIC outputs a drive signal necessary for detection to the sensor panel SPNL in a sensor mode, and additionally receives a detected signal from the sensor panel SPNL.

The display panel PNL includes a display section (a display area) DA for displaying videos, and the non-display section (the non-display area or the peripheral area) NDA that is formed in a frame shape and surrounds the display section DA. The display section DA includes plural pixels PX that are disposed both in the first direction X and in the second direction Y which is perpendicular to the first direction X (or in the second direction Y different from the first direction X), that is, disposed in a matrix shape.

The sensor panel SPNL includes: a sensor-active region (also referred to a detection area or an active area, and hereinafter referred to as an active area) AA that is formed so as to overlap the display section DA for displaying videos; and a nonactive area NAA that is formed in a frame shape and surrounds the active area AA. The active area AA includes: plural detection electrodes Rx each of which extends in the first direction X while the plural detection electrodes Rx are disposed in the second direction Y; and plural drive electrodes Tx each of which extends in the second direction Y while the plural drive electrodes Tx are disposed in the first direction X.

The cover glass CG is formed so as to cover the display panel PNL and the sensor panel SPNL. The cover glass CG can be made by, for example, a transparent glass material or the like.

The display pane PNL according to this embodiment can be any of a transmission type display panel having a transmission display function to display videos by selectively transmitting lights from the backside of the first substrate SUB1, a reflection type display panel having a reflection display function to display videos by selectively reflecting lights from the frontside of the second substrate SUB2, and a semi-transmission type display panel having both transmission display function and reflection display function.

The display panel PNL can include a configuration compatible with any of a display mode using a longitudinal electric field along the normal line of the main surface of the substrate, a display mode using an oblique electric field that is tilted in an oblique direction to the main surface of the substrate, and a display mode using an appropriate combination of the abovementioned longitudinal electric field and oblique electric field.

Circuit Configuration Example of Display Device

Figure 2:
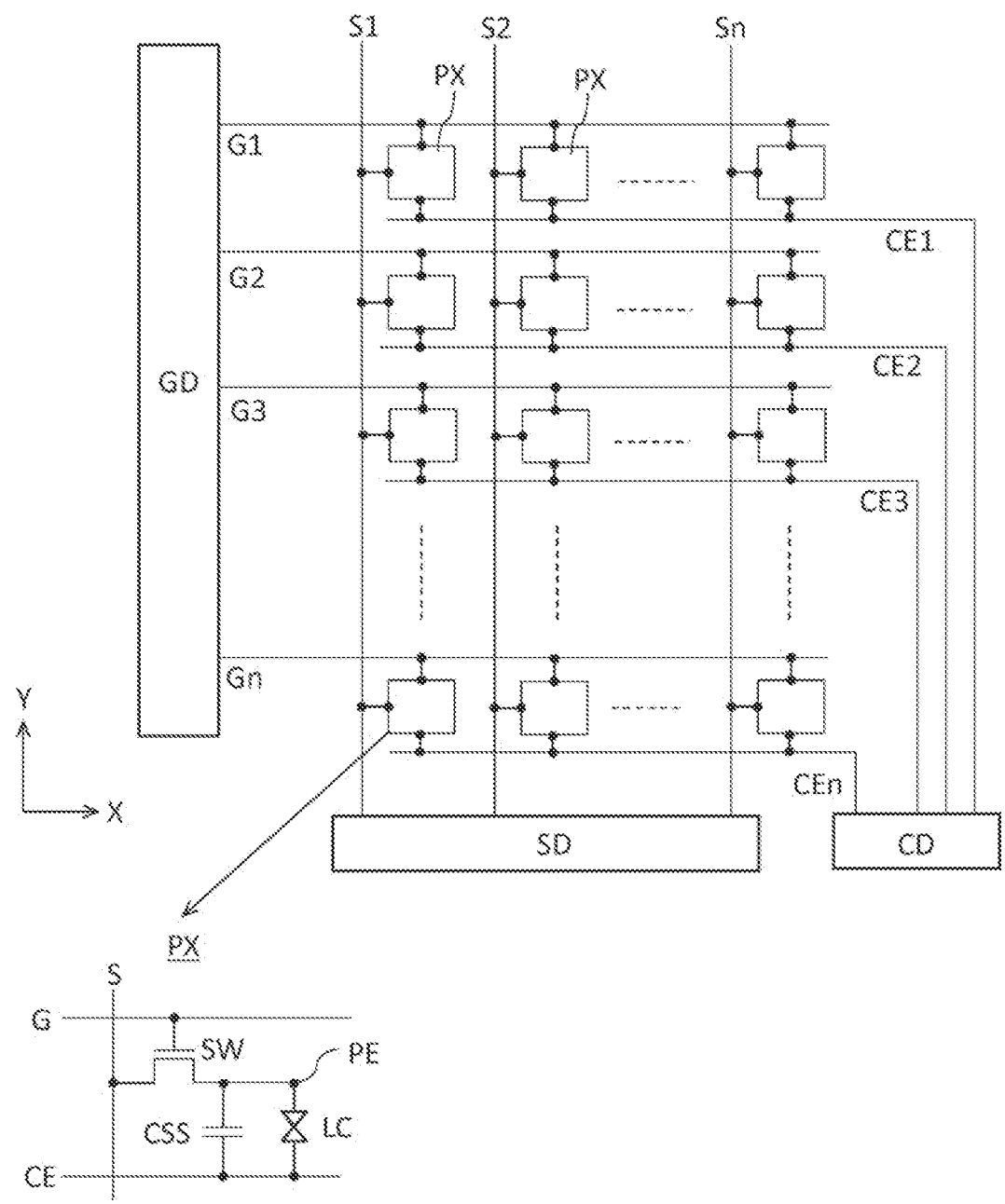
FIG. 2 is a diagram showing the basic configuration of a pixel PX and an equivalent circuit of a display panel.

FIG. 2 is a diagram showing the basic configuration of a pixel PX and an equivalent circuit of the display panel. The plural pixels PX are disposed both in the first direction X and in the second direction Y, that is, in a matrix shape. Plural scanning lines G (G1, G2, . . . ) are electrically connected to a scanning line drive circuit GD. Plural signal lines S (S1, S2, . . . ) are electrically connected to a signal line drive circuit SD. Plural common electrodes CE (CE1, CE2, . . . ) are electrically connected to the voltage supply unit CD of a common voltage (Vcom) and supplied to the plural pixels PX. One pixel PX is electrically connected to one scanning line, one signal line, and one common electrode CE. Here, it is not always necessary that each of the scanning lines G and the signal lines S should linearly extend, and it is all right if parts of these lines are bent. For example, even if parts of the signal lines S are bent, it will be assumed that each of the signal lines S extends in the second direction Y as a whole.

Each pixel PX includes a switching element SW, a pixel electrode PE, a common electrode CE, a liquid crystal layer LC, and the like. The switching element SW is formed by, for example, a thin film transistor (TFT), and electrically connected to a scanning line G and a signal line S. The scanning line G is electrically connected to the switching element SW of each of plural pixels PX arranged in the first direction X. The signal line S is electrically connected to the switching element SW of each of pixels PX arranged in the second direction Y. The pixel electrode PE is electrically connected to the switching element SW. Each pixel electrode PE faces the common electrode CE and drives a liquid crystal layer LC using an electric field induced between each pixel electrode PE itself and the common electrode CE. A retention capacitance CSS is formed between, for example, an electrode the potential of which is the same as that of the common electrode CE and an electrode the potential of which is the same as that of the pixel electrode PE.

Cross Section Configuration Example of Display Device

FIG. 3 is a diagram conceptually showing the cross-sectional view of the display device taken along the line A-A of FIG. 1. A lower polarizing plate 200 is bonded to the lower surface of the first substrate SUB1, and an upper polarizing plate 201 is bonded to the upper surface of the second substrate SUB2. The seal member SE is located in the non-display section NDA and seals the liquid crystal layer LC while bonding the first substrate SUB1 and the second substrate SUB2 together. A combination of the first substrate SUB1, the second substrate SUB2, the lower polarizing plate 200, the upper polarizing plate 201, the seal member SE, and the liquid crystal layer LC is referred to as the display panel PNL. Because the display panel PNL itself does not emit light, a backlight 202 is disposed under the lower polarizing plate 200 on the backside of the display panel PNL. Here, in the case of a display panel that uses self-emitting pixels, the backlight 202 is unnecessary.

The lower surface of the sensor substrate SSUB is bonded to the upper surface of the upper polarizing plate 201 with a bonding layer 203 therebetween. A drive electrode Tx, which is made of a first metal wiring layer 204, is formed on the upper surface of the sensor substrate SSUB, and a first insulating film 205 is formed so as to cover the drive electrodes Tx. Plural detection electrodes Rx, which are made of second metal wiring layers 206, are formed on the upper surface of the first insulating film 205, and a second insulating film 207 is formed so as to cover the plural detection electrodes Rx. The cover glass CG is bonded to the upper surface of the second insulating film 207 with a bonding layer 208 therebetween. A combination of the sensor substrate SSUB, the drive electrodes Tx, the first insulating film 205, the detection electrodes Rx, and the second insulating film 207 is referred to as the sensor panel SPNL.

The first metal wiring layer 204 and the second metal wiring layer 206 can be made of a transparent material such as ITO (Indium Tin Oxide) or IZO (Indium Zinc Oxide), for example. The first insulating film 205 and the second insulating film 207 can be made of an organic insulating film formed by an organic insulating material such as acrylate resin. In addition, the second insulating film 207 can be made of an inorganic insulating film formed by an inorganic insulating material such as silicon oxide, silicon nitride, or silicon oxynitride.

Next, a configuration example of the sensor panel SPNL will be explained.

Configuration Example of Touch Detection Node

Figure 4:
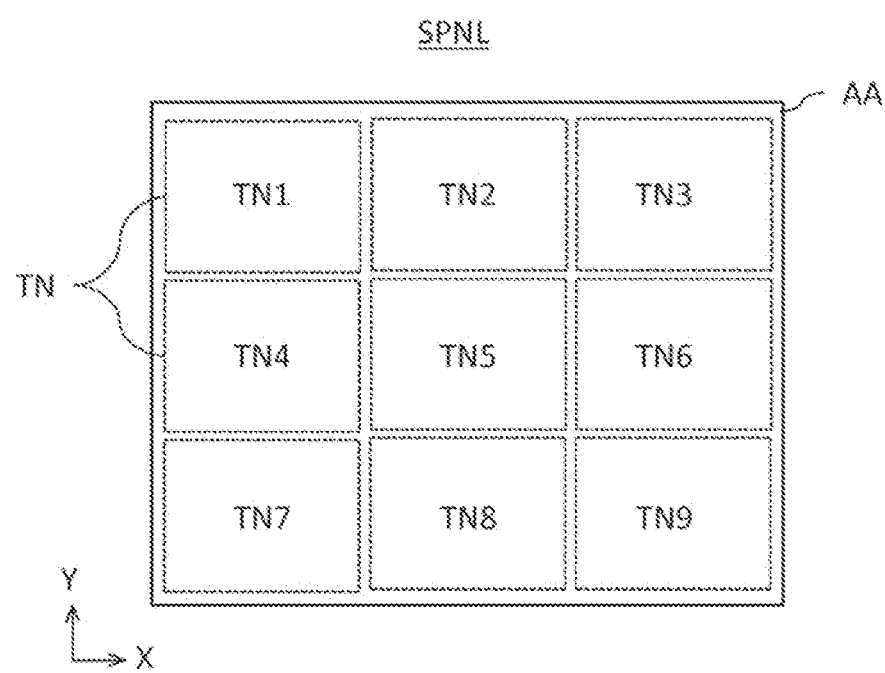
FIG. 4 is a diagram for explaining the touch detection nodes of a sensor panel.

FIG. 4 is a diagram for explaining the touch detection nodes of a sensor panel. In this example, a case where the sensor panel SPNL and the active area AA have rectangular shapes will be explained as typical examples. As shown in FIG. 4, the sensor panel SPNL includes the active area AA of a rectangular shape in a plane view, and it will be assumed that plural touch detection nodes (regions) TN, which are formed both in the first direction X and the second direction Y, that is, in a matrix shape, are virtually prepared in the active area AA. TN1 to TN9 by way of example. It will be assumed that, in this example, each of the touch detection nodes (regions) TN1 to TN9 is of a rectangular shape.

In an actual sensor panel SPNL, the number of touch detection nodes (regions) are equal to or larger than nine. Furthermore, among actual sensor panels SPNL, there also exist some sensor panels SPNL that are configured in such a way that the four corners of the active area AA are rounded in circular arc shapes. In this case, touch detection nodes located at the four corners are rounded in circular arc shapes respectively so as to conform to the shapes of the corners of the active area AA that are rounded in circular arc shapes. The present disclosure is also applicable to a sensor panel SPNL the four corners of the active area AA of which are rounded in circular arc shapes.

Configuration Example of Touch Position Detection Circuit

Figure 5:
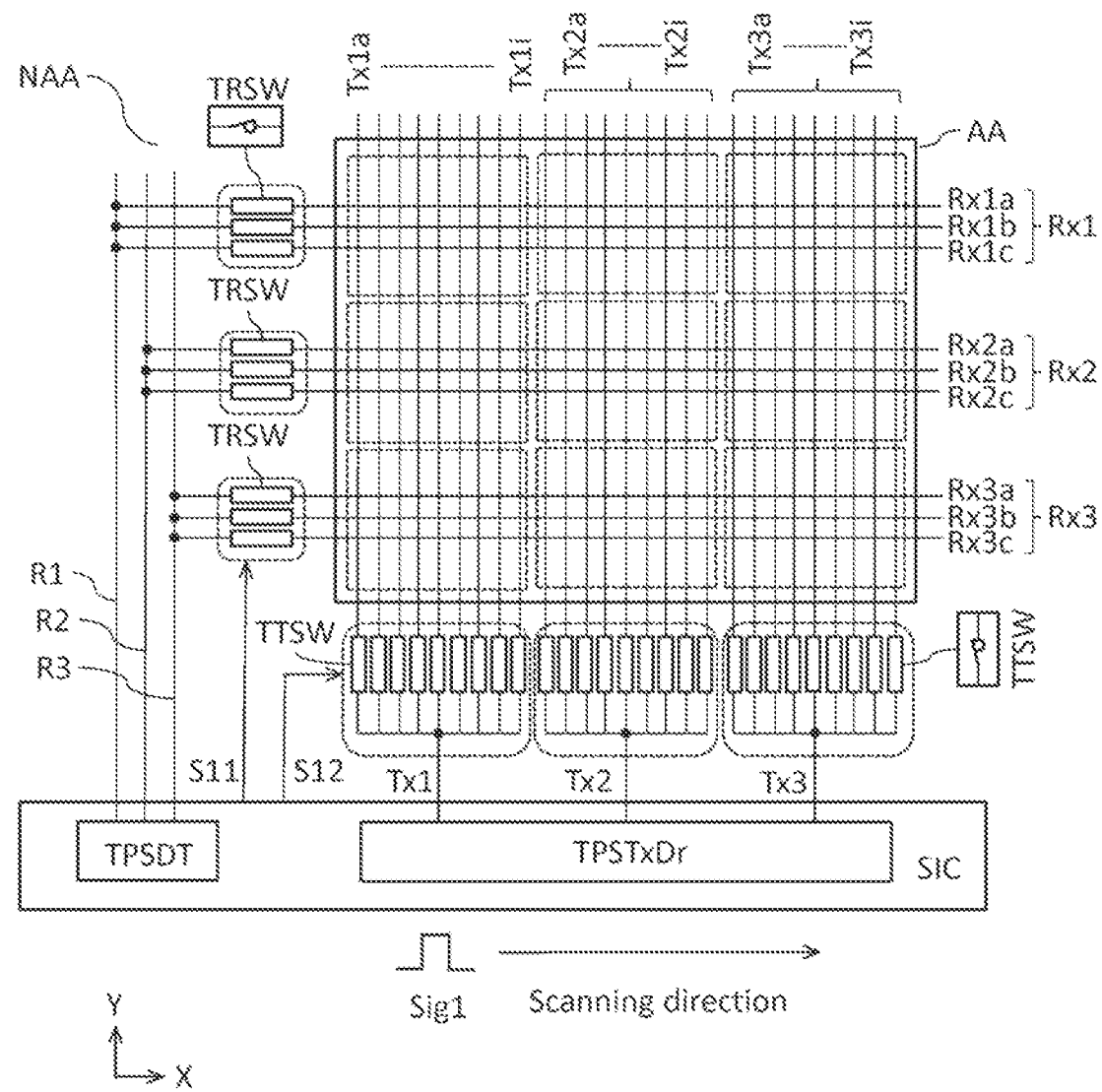
FIG. 5 is a diagram showing a configuration example of a touch position detection circuit.

FIG. 5 is a diagram showing a configuration example of a touch position detection circuit. FIG. 5 shows a case where plural drive electrodes Tx and plural detection electrodes Rx are installed at the touch detection nodes TN1 to TN9 shown in FIG. 4. Here, although the reference signs of the touch detection nodes TN1 to TN9 shown in FIG. 4 are not depicted in FIG. 5 for avoiding the complexity of FIG. 5, the following explanations will be made using the reference signs of the touch detection nodes TN1 to TN9 shown in FIG. 4.

The touch detection nodes TN1, TN2, and TN3 are provided with L detection electrodes (where L represents the number) each of which extends in the first direction X. As an example, the touch detection nodes TN1, TN2, and TN3 are provided with three detection electrodes Rx1a, Rx1b, and Rx1c. The three detection electrodes Rx1a, Rx1b, and Rx1c are bundled by three switching elements TRSW installed in the outside (exterior) of the active area AA, and the three detection electrodes Rx1a, Rx1b, and Rx1c are electrically connected to a lead wiring (a peripheral wiring) R1 installed in the outside (exterior) of the active area AA. In other words, at the time of touch position detection, the three detection electrodes Rx1a, Rx1b, and Rx1c are bundled by the three switching elements TRSW which are in an on-state, and the three detection electrodes function as one detection electrode Rx1.

The touch detection nodes TN4, TN5, and TN6 are provided with L detection electrodes (where L represents the number) each of which extends in the first direction X. As an example, the touch detection nodes TN4, TN5, and TN6 are provided with three detection electrodes Rx2a, Rx2b, and Rx2c. The detection electrodes Rx2a, Rx2b, and Rx2c are bundled by three switching elements TRSW installed in the outside of the active area AA, and the three detection electrodes Rx2a, Rx2b, and Rx2c are electrically connected to a lead wiring R2 installed in the outside (exterior) of the active area AA. In other words, at the time of touch position detection, the three detection electrodes Rx2a, Rx2b, and Rx2c are bundled by the three switching elements TRSW which are in an on-state, and the three detection electrodes function as one detection electrode Rx2.

The touch detection nodes TN7, TN8, and TN9 are provided with L detection electrodes (where L represents the number) each of which extends in the first direction X. As an example, the touch detection nodes TN7, TN8, and TN9 are provided with three detection electrodes Rx3a, Rx3b, and Rx3c. The detection electrodes Rx3a, Rx3b, and Rx3c are bundled by three switching elements TRSW installed in the outside of the active area AA, and the three detection electrodes Rx3a, Rx3b, and Rx3c are electrically connected to a lead wiring R3 installed in the outside (exterior) of the active area AA. In other words, at the time of touch position detection, the three detection electrodes Rx3a, Rx3b, and Rx3c are bundled by the three switching elements TRSW which are in an on-state, and the three detection electrodes function as one detection electrode Rx3.

The touch detection nodes TN1, TN4, and TN7 are provided with N drive electrodes (where N represents the number) each of which extends in the second direction Y. As an example, the touch detection nodes TN1, TN4, and TN7 are provided with nine drive electrodes Tx1a to Tx1i. The drive electrodes Tx1a to Tx1i are bundled by nine switching elements TTSW installed in the outside (exterior) of the active area AA, and the nine drive electrodes are treated as one drive electrode Tx1. In other words, at the time of touch position detection, the nine drive electrodes Tx1a to Tx1i are bundled by the nine switching elements TTSW which are in an on-state, and the nine drive electrodes function as one drive electrode Tx1.

The touch detection nodes TN2, TN5, and TN8 are provided with N drive electrodes (where N represents the number) each of which extends in the second direction Y. As an example, the touch detection nodes TN2, TN5, and TN8 are provided with nine drive electrodes Tx2a to Tx2i. The drive electrodes Tx2a to Tx2i are bundled by nine switching elements TTSW installed in the outside (exterior) of the active area AA, and the nine drive electrodes are treated as one drive electrode Tx2. In other words, at the time of touch position detection, the nine drive electrodes Tx2a to Tx2i are bundled by the nine switching elements TTSW which are in an on-state, and the nine drive electrodes function as one drive electrode Tx2.

The touch detection nodes TN3, TN6, and TN9 are provided with N drive electrodes (where N represents the number) each of which extends in the second direction Y. As an example, the touch detection nodes TN3, TN6, and TN9 are provided with nine drive electrodes Tx3a to Tx3i. The drive electrodes Tx3a to Tx3i are bundled by nine switching elements TTSW installed in the outside (exterior) of the active area AA, and the nine drive electrodes are treated as one drive electrode Tx3. In other words, at the time of touch position detection, the nine drive electrodes Tx3a to Tx3i are bundled by the nine switching elements TTSW which are in an on-state, and the nine drive electrodes function as one drive electrode Tx3.

The drive electrodes Tx1 to Tx3 are electrically connected to a drive circuit TPSTxDr of the sensor IC chip SIC used for touch position detection. In addition, the lead wirings R1, R2, and R3 are electrically connected to a detection circuit TPSDT for touch position detection.

The on-state and off-state of the switching elements TRSW and TTSW are controlled by switch signals S11 and S12 outputted from the sensor IC chip SIC respectively. For example, the switching elements TRSW and TTSW are set in an on-state at the time of touch position detection by the high level of the switch signals S11 and S12 respectively, and set in an off-state at the times of behaviors other than the time of touch position detection by the low level of the switch signals S11 and S12 respectively. Each of the switching elements TRSW and TTSW can be made of, for example, a thin film transistor (TFT). As described later, the potential level of the switch signal S11 is controlled by the sensor IC chip SIC so that the potential level of the switch signal S11 becomes a high level or a low level accordingly at the time of touch position detection.

Next, the behavior of the touch position detection circuit at the time of touch position detection will be explained. In this embodiment, although a mutual detection scheme will be explained as an example of the touch position detection scheme, a self-detection scheme can also be used.

The drive electrodes Tx1 to Tx3 and the detection electrodes Rx1 to Rx3 are disposed with a predefined space therebetween owing to the film thickness of the first insulating film 205 as shown in FIG. 3. Therefore, mutual capacitances (electrostatic capacitances) essentially exist between the drive electrodes Tx1 to Tx3 and the detection electrodes Rx1 to Rx3.

In the mutual detection scheme, the drive electrodes Tx1 to Tx3 are scanned with a drive pulse Sig1 at a predefined cycle by the drive circuit TPSTxDr. Now, it will be assumed that a finger of a user exists near to the intersectional portion of the detection electrode Rx2 and the drive electrode Tx2 (the intersectional portion is corresponding to the touch detection node TN5). If the drive electrode Tx2 is provided with the drive pulse Sig1 at this time, a pulse waveform is obtained at the detection electrode Rx2, and a detection pulse, the magnitude level of which is lower than that of a detection pulse obtained from the detection electrode Rx1 or Rx3, is obtained from the detection Rx2. The detection electrodes Rx1, Rx2, and Rx3 monitor fringe electric fields from the drive electrodes Tx1, Tx2, and Tx3, and if a conductive object such as a finger approaches one of the touch detection nodes, this conductive object brings about an effect to shield the corresponding fringe electric field. Shielding the corresponding fringe electric field causes the detection potential of the corresponding detection electrode Rx to be lowered. Using an electrode drive timing by the drive pulse Sig1 and the output timings of detection pulses, it becomes possible to detect the two-dimensional position of the finger on the plane of the active area AA of the sensor panel SPNL.

A mutual capacitance (electrostatic capacitance) at each of the touch detection nodes TN1 to TN9 will be explained hereinafter. As shown in FIG. 5, three detection electrodes (Rxna, Rxnb, Rxnc, where n=1, 2, or 3) and nine drive electrodes (Txna to Txni, where n=1, 2, or 3) intersect with one another at the touch detection nodes TN1 to TN9 respectively. The areas of the intersectional portions of the three detection electrodes (Rxna, Rxnb, Rxnc, where n=1, 2, or 3) and the nine drive electrodes (Txna to Txni, where n=1, 2, or 3) dominantly define the capacitance values of the corresponding mutual capacitances respectively. Therefore, it is conceivable that each of the touch detection nodes TN1 to TN9 shown in FIG. 5 has a mutual capacitance of the same capacitance value substantially.

Configuration Example of Detection Circuit TPSDT

Figure 6:
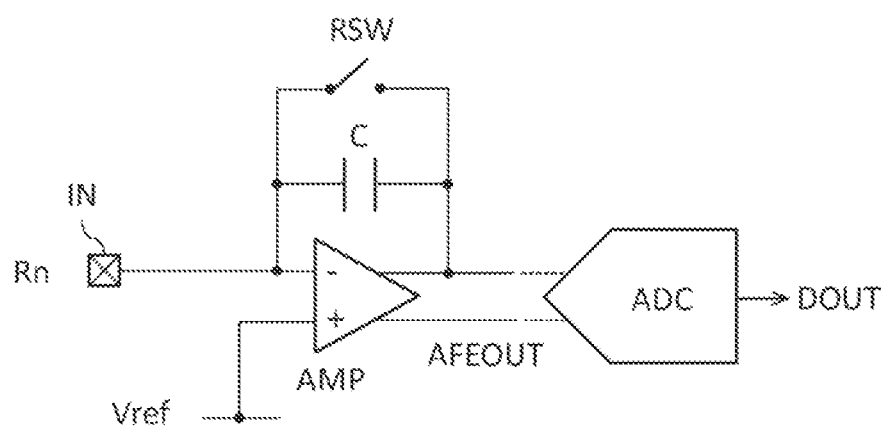
FIG. 6 is a circuit diagram used for explaining the configuration of a detection circuit.

FIG. 6 is a circuit diagram used for explaining the configuration of the detection circuit TPSDT. FIG. 6 shows a configuration example of one control circuit AFE of plural control circuits AFE included in the detection circuit TPSDT. The plural control circuits AFE are connected to plural lead wirings Rn (n=1, 2, 3, . . . ) respectively. A control circuit AFE includes: an input terminal IN to which one of the lead wirings Rn (n=1, 2, 3, . . . ) is electrically connected; an amplifier circuit AMP; a capacitance element C; and a reset switching element RSW. The output signal AFEOUT of the amplifier circuit AMP is supplied to an analog-digital conversion circuit ADC.

The input terminal IN is electrically connected to the inverting input terminal (−) of the amplifier circuit AMP, and a reference voltage Vref, which is set to a predefined voltage, is applied to the noninverting input terminal (+) of the amplifier circuit AMP. The capacitance element C and the reset switching element RSW are electrically connected to the inverting input terminal (−) of the amplifier circuit AMP and the first output terminal of the amplifier circuit AMP respectively. The first output terminal and the second output terminal of the amplifier circuit AMP are electrically connected to a pair of input terminals of the analog-digital conversion circuit ADC respectively.

An analog signal inputted into the input terminal IN when the reset switching element RSW is in an off state is integrated by the amplifier circuit AMP and the capacitance element C. The integrated output signal AFEOPUT is inputted into the analog-digital conversion circuit ADC and sampled so as to be converted into a digital signal, and the digital signal DOUT obtained by the conversion is outputted from the analog-digital conversion circuit ADC. When the reset switching element RSW is in an on state, the potentials of the input terminal IN, the first output terminal, and the second output terminal are set to the reference voltage Vref.

Comparative Example

Figure 7:
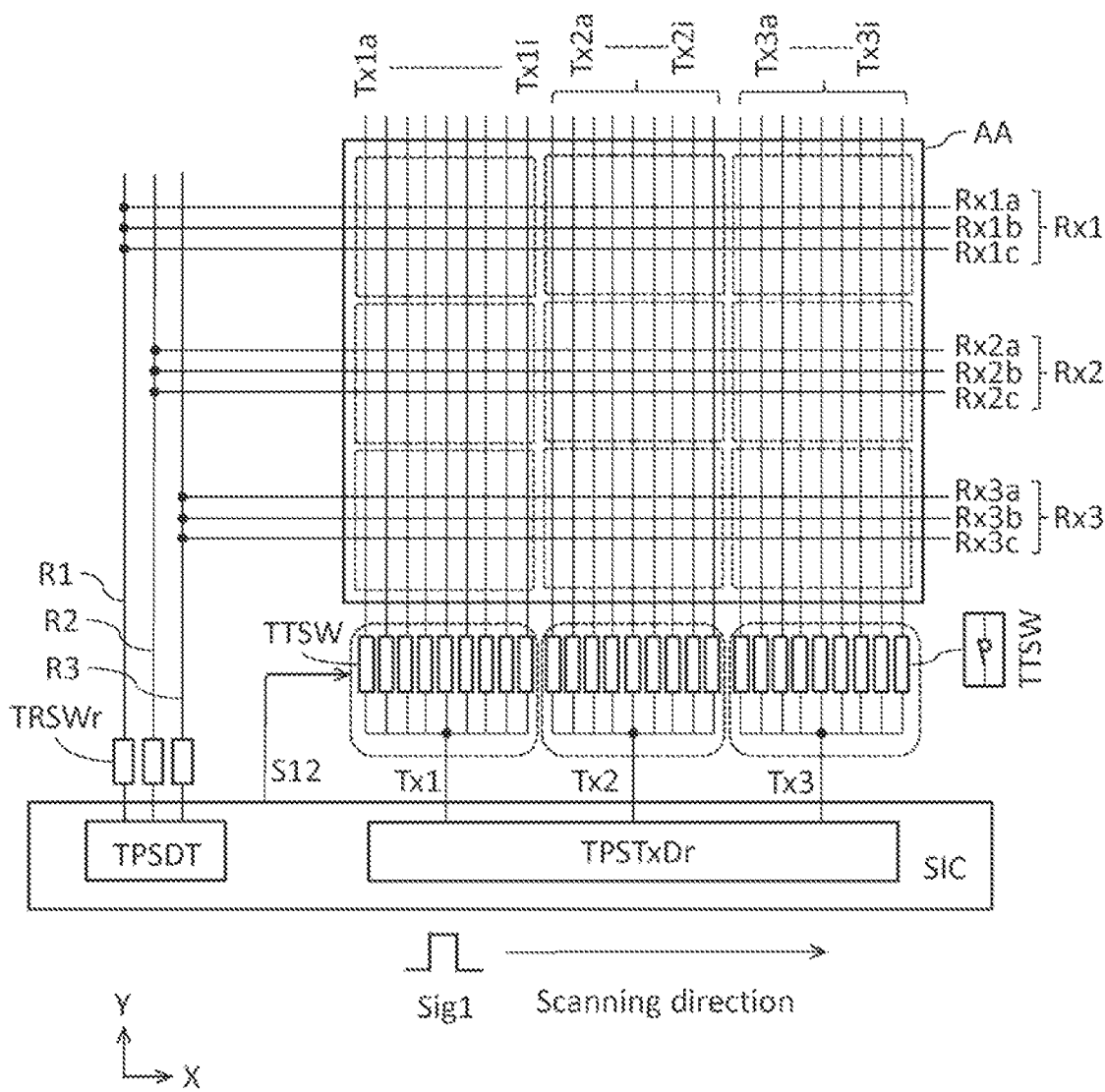
FIG. 7 is a diagram showing a configuration example of a touch position detection circuit according to a comparative example.

FIG. 7 is a diagram showing a configuration example of a touch position detection circuit according to a comparative example. FIG. 7 is different from FIG. 5 in that, in FIG. 7, the switching elements TRSW are not installed between the three detection electrodes (Rxna, Rxnb, and Rxnc: n=1, 2, or 3) and the lead wirings R1, R2, and R3, and switching elements TRSWr are installed between the lead wirings R1, R2, and R3 and the input terminals of the respective control circuits AFE in the detection circuit TPSDT. Because other configurations shown in FIG. 7 are the same as those shown in FIG. 5, redundant explanations thereabout will be omitted. Plural control circuits AFE one of which is shown in FIG. 6 are installed in the detection circuit TPSDT shown in FIG. 7.

There are some cases where fringe electric fields are generated between the outermost drive electrodes Tx1 of the plural drive wirings Tx1, Tx2, and Tx3 and the plural lead wirings R1, R2, and R3. It has been found out that, if any of these fringe electric fields is shielded by a conductive object such as a finger, a touch noise is generated, and touch false detection occurs.

(Drive Method at the Time of Touch Position Detection According to Comparative Example)

Figure 8:
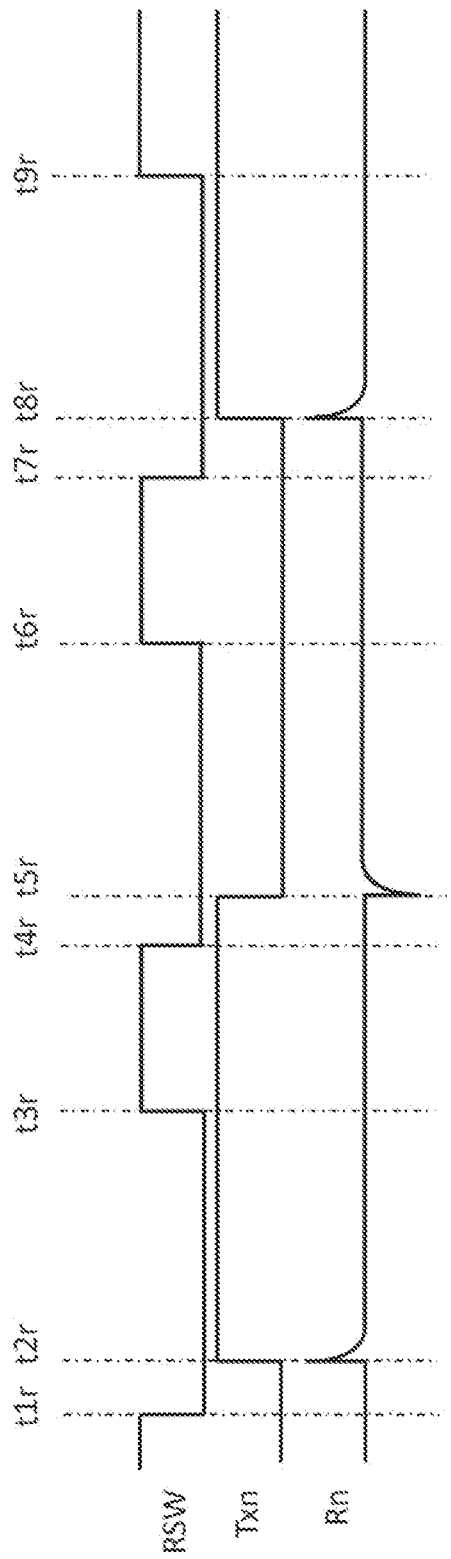
FIG. 8 is a waveform chart used for explaining a drive method at the time of touch position detection according to the comparative example.

FIG. 8 is a waveform chart used for explaining a drive method at the time of touch position detection according to the comparative example. Here, the following descriptions are made under the assumption that, in FIG. 8, the switching elements TTSW are always kept in an on-state at the time of touch position detection.

Before the time tr1, the switching elements TRSWr are set in an off-state, and the reset switching elements RSW are set in an on-state, and the potentials of the input terminals IN of the control circuits AFE are set to the reference voltage Vref that is a reset potential.

At the time t1r, the reset switching elements RSW change their states from an on-state to an off-state, therefore the reset states are released. In addition, the states of the switching elements TRSWr are made from an off-state to an on-state.

At the time t2r, the drive wirings Txn are driven from in a low level to in a high level. The detection electrodes Rxn (Rx1, Rx2, and Rx3) are provided to the input terminals IN of the control circuits AFE via the lead wirings Rn (R1, R2, and R3) respectively.

At the time t3r, the states of the switching elements TRSWr are made from an on-state to an off-state, and the reset switching elements RSW change their states from an off-state to an on-state, so that the potentials of the input terminals IN of the control circuits AFE are set to the reference voltage Vref that is a reset potential.

At the time t4r, the reset switching elements RSW change their states from an on-state to an off-state, therefore the reset states are released. In addition, the states of the switching elements TRSWr are made from an off-state to an on-state.

At the time t5r, the drive wirings Txn are driven from in a high level to in a low level. With this, the potential changes of the detection electrodes Rxn are provided to the input terminals IN of the control circuits AFE via the lead wirings Rn respectively.

At the time t6r as is the case with the time t3r, the states of the switching elements TRSWr are made from an on-state to an off-state, and the reset switching elements RSW change their states from an off-state to an on-state, so that the potentials of the input terminals IN of the control circuits AFE are set to the reference voltage Vref that is a reset potential.

Because the operations at the times t7r, t8r, and t9r are the same as those at the times t1r, t2r, and t3r, redundant explanations will be omitted.

To put it simply, if the outermost drive electrodes Tx1 change when the reset switching elements RSW are in an off-state and the switching elements TRSWr are in an on-state, the effects owing to the changes of the outermost drive electrodes Tx1 reach the lead wirings Rn and touch false detection occurs.

Drive Method at the Time of Touch Position Detection According to Embodiment

Figure 9:
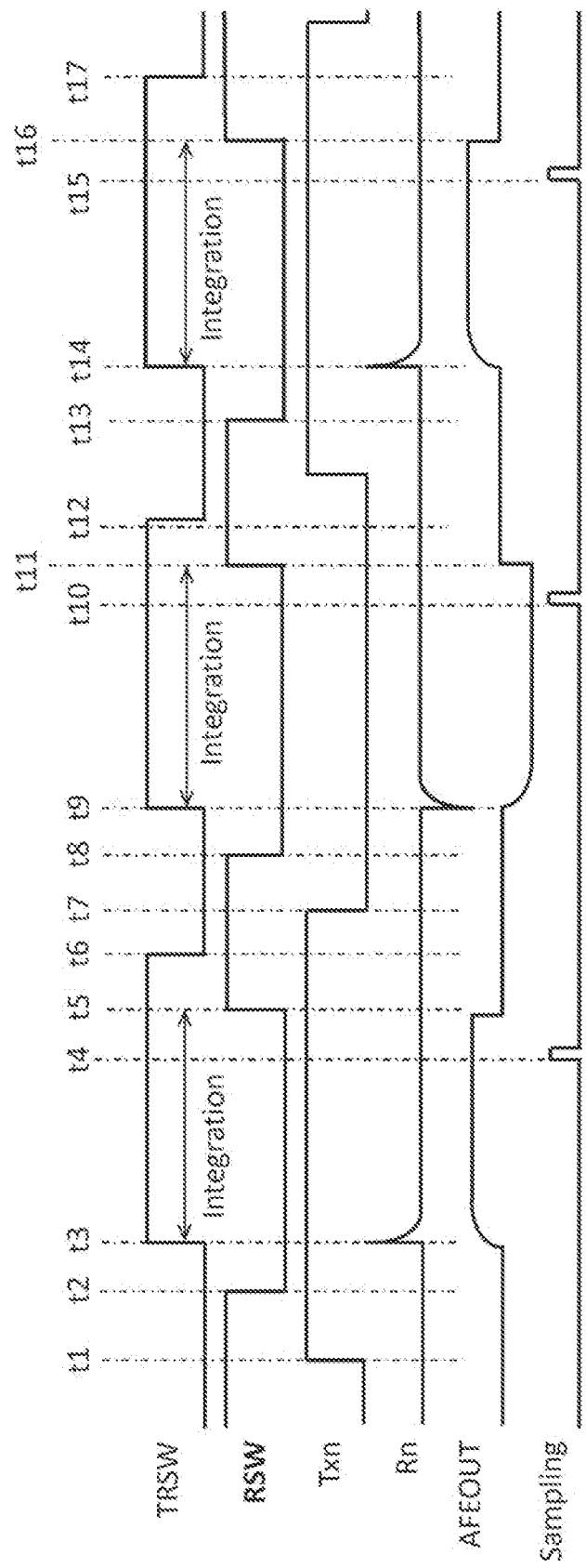
FIG. 9 is a waveform chart used for explaining a drive method at the time of touch position detection according to the embodiment.

FIG. 9 is a waveform chart used for explaining a drive method at the time of touch position detection according to the embodiment. Here, as is the case with FIG. 8, the following descriptions are made under the assumption that, in FIG. 9, the switching elements TTSW are always kept in an on-state at the time of touch position detection.

At the time t1, the drive wirings Txn are driven from in a high level to in a low level. The reset switching elements RSW are in an on-state, and the switching elements TRSW are in an off-state. Because the reset switching elements RSW are in an on-state, the potentials of the lead wirings Rn (R1, R2, and R3) and the input terminals IN of the control circuits AFE are set to the reference voltage Vref that is a reset potential. When the switching elements TRSW are in an off-state, the detection electrodes Rxn (Rx1, Rx2, and Rx3) are set in a flowing state or a bias voltage is applied to the detection electrodes Rxn (Rx1, Rx2, and Rx3) via high resistance. Therefore, if the drive wirings Txn are driven from in a low level to in a high level when the switching elements TRSW are in an off-state, the level of the detection electrodes Rxn also change from a low level to a high level owing to the changes of the fringe electric fields between the drive wirings Txn and the detection electrodes Rxn.

At the time t2, the reset switching elements RSW change their states from an on-state to an off-state. The switching elements TRSW remain in an off-state.

At the time t3, the switching elements TRSW change their states from an off-state to an on-state, so that the integration periods of the control circuits AFE start. With this, the potential changes of the detection electrodes Rxn (Rx1, Rx2, and Rx3) are provided to the input terminals IN of the control circuits AFE via the lead wirings Rn respectively. The output signals AFEOUT are outputted from the control circuits AFE.

At the time t4, the analog-digital conversion circuits ADC sample the output signals AFEOUT, so that the analog potentials of the output signals AFEOUT are converted to digital signals by the sampling.

At the time t5, the reset switching elements RSW change their states from an off-state to an on-state. With this, the potentials of the input terminals IN and the output terminals of the control circuits AFE and the potentials of the lead wirings Rn are set to the reference voltage Vref that is a reset potential. Here, a time period between the time t3 and the time t5 corresponds to the integration periods of the control circuits AFE.

At the time t6, the switching elements TRSW change their states from an on-state to an off-state. At this time, the potentials of the lead wirings Rn (R1, R2, and R3) are kept the reference voltage Vref that is a reset potential.

At the time t7, the drive wirings Txn are driven from in a high level to in a low level. At this time, because the switching elements TRSW are in an off-state, the detection electrodes Rxn (Rx1, Rx2, and Rx3) change their levels from a high level to a low level.

At the time t8, the reset switching elements RSW change their states from an on-state to an off-state.

At the time t9, as is the case with the time t3, the switching elements TRSW change their states from an off-state to an on-state, so the integration periods of the control circuits AFE start. With this, the potentials of the detection electrodes Rxn (Rx1, Rx2, and Rx3), which have already changed at the time t7, are provided to the input terminals IN of the control circuits AFE via the lead wirings Rn respectively. The output signals AFEOUT are outputted from the control circuits AFE.

At the time t10, the analog-digital conversion circuits ADC sample the output signals AFEOUT, so that the analog potentials of the output signals AFEOUT are converted into digital signals by the sampling.

At the time t11, the reset switching elements RSW change their states from an off-state to an on-state. With this, the potentials of the input terminals IN and the output terminals of the control circuits AFE and the potentials of the lead wirings Rn are set to the reference voltage Vref that is a reset potential.

At the time t12, the switching elements TRSW change their states from an on-state to an off-state. At this time, the potentials of the lead wirings Rn (R1, R2, and R3) are kept the reference voltage Vref that is a reset potential.

If the levels of the drive wirings Txn change from a low level to a high level during a time period between the time t12 and the time t13, the levels of the detection electrodes Rxn also change from a low level to a high level owing to the changes of the fringe electric fields between the drive wirings Txn and the detection electrodes Rxn.

At the time t13, the reset switching elements RSW change their states from an on-state to an off-state.

At the time t14, the switching elements TRSW change their states from an off-state to an on-state, so the integration periods of the control circuits AFE start. With this, the potentials of the detection electrodes Rxn (Rx1, Rx2, and Rx3), which have already changed from a low level to a high level in accordance with the changes of the drive wirings Txn during the time t12 and the time t13, are provided to the input terminals IN of the control circuits AFE via the lead wirings Rn respectively. The output signals AFEOUT are outputted from the control circuits AFE.

At the time t15, the analog-digital conversion circuits ADC sample the output signals AFEOUT, so that the analog potentials of the output signals AFEOUT are converted into digital signals by the sampling.

At the time t16, the reset switching elements RSW change their states from an off-state to an on-state. With this, the potentials of the input terminals IN and the output terminals of the control circuits AFE and the potentials of the lead wirings Rn are set to the reference voltage Vref that is a reset potential.

At the time t17, the reset switching elements TRSW change their states from an on-state to an off-state, and the potentials of the lead wirings Rn (R1, R2, and R3) are set to the reference voltage Vref that is a reset potential. Furthermore, the drive wirings Txn are driven from in a high level to in a low level.

In other words, the drive method shown in FIG. 9 has the following features.

1) Before the integration periods of the control circuits AFE, the switching elements TRSW are set in an off-state, and the potentials of the lead wirings Rn (R1, R2, and R3) are set to the reference voltage Vref that is a reset potential.

2) After the drive wirings Txn are driven, the states of the reset switching elements RSW are changed from an on-state to an off-state, and then the states of the reset switching elements RSW are changed from an off-state to an on-state.

The plural switching elements TRSW, which connect the detection electrodes Rxn disposed in the active area AA and the lead wirings R1, R2, and R3 disposed in the nonactive area NAA, are disposed in the vicinity of the active area AA. The plural switching elements TRSW are in an off-state, and the potentials of the lead wirings R1, R2, and R3 are fixed to the reset potential (VRef), the drive wirings Txn are toggled. With this, the effect brought about by couplings between the outermost drive wirings Tx1 and the lead wirings R1, R2, and R3 can be eliminated. Consequently, the accuracy of touch detection can be improved.

Configuration Example of Sensor Panel SPNL

Figure 10:
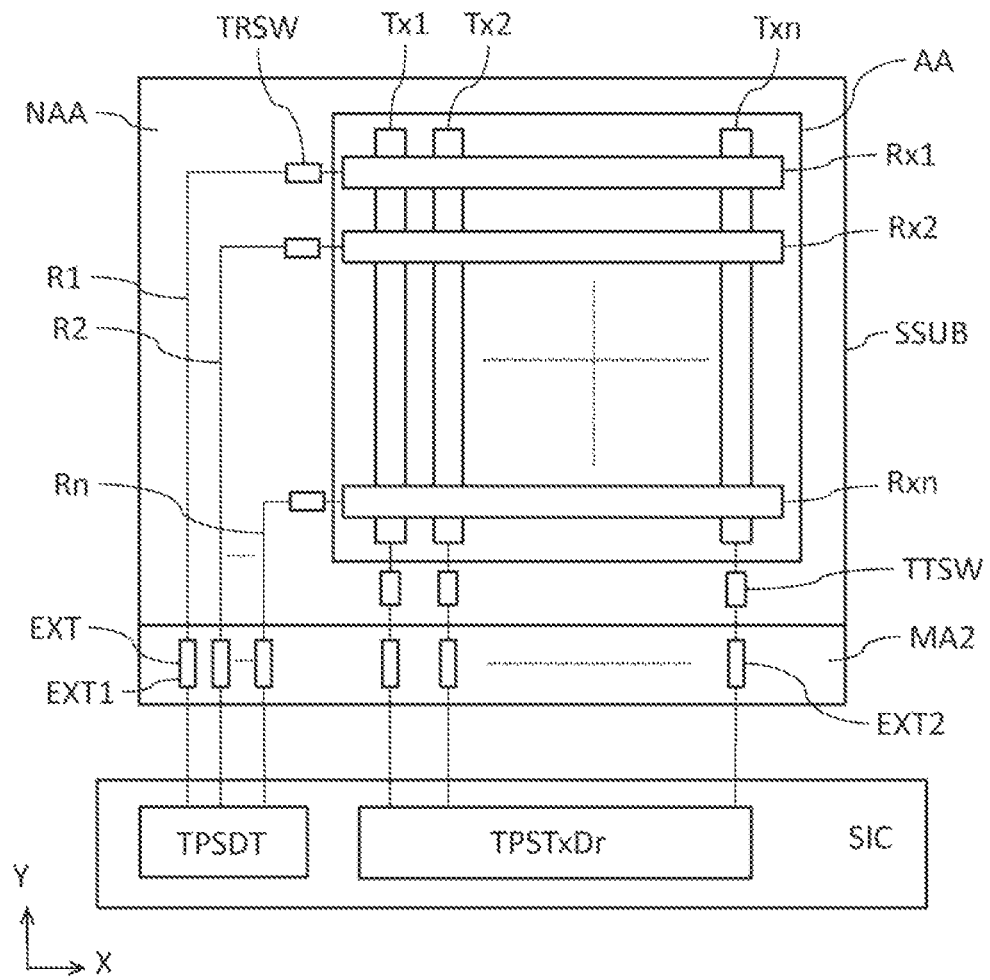
FIG. 10 is a diagram used for explaining a first configuration example of a sensor panel.
Figure 11:
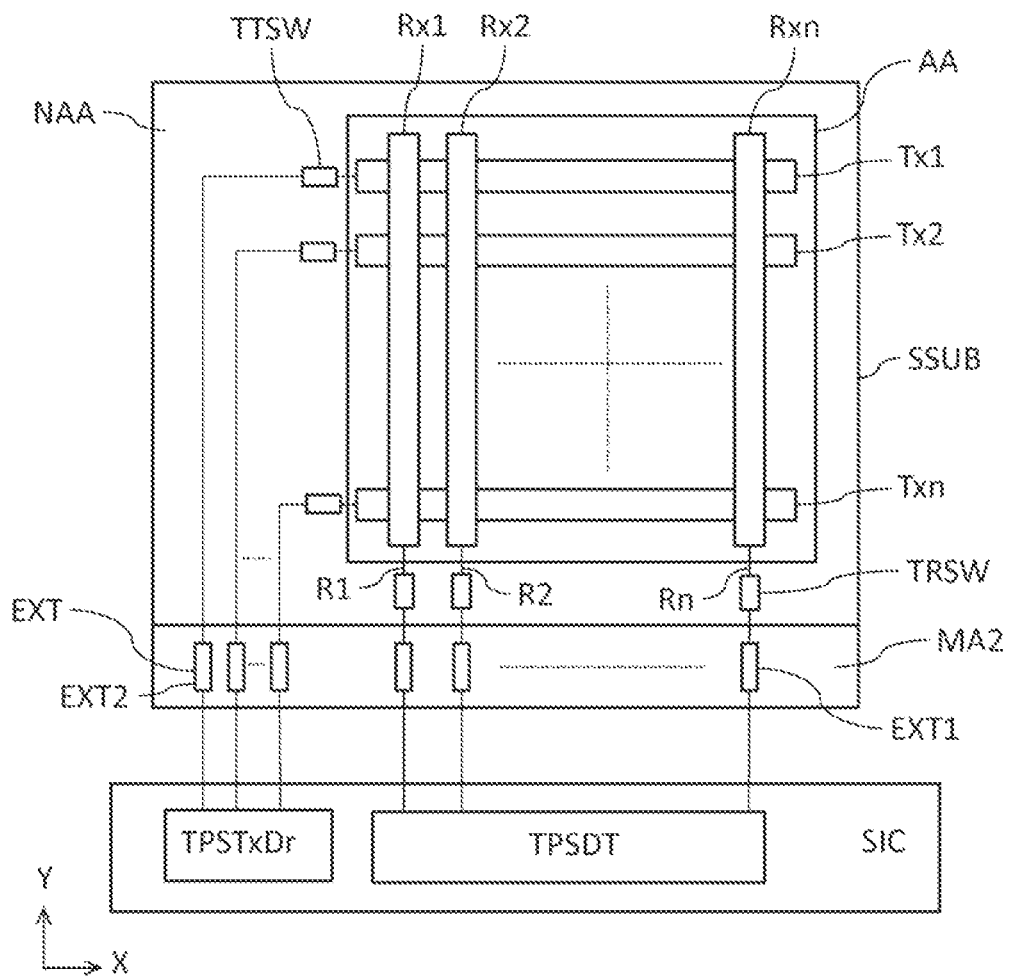
FIG. 11 is a diagram used for explaining a second configuration example of the sensor panel.

Next, a configuration example of the sensor panel SPNL will be explained with reference to FIG. 10 and FIG. 11. Descriptions about FIG. 10 and FIG. 11 are made by describing the three detection electrodes Rx1a, Rx1b, and Rx1c in a lump as detection electrodes Rx1, the three detection electrodes Rx2a, Rx2b, and Rx2c in a lump as detection electrodes Rx2, and the three detection electrodes Rx3a, Rx3b, and Rx3c in a lump as detection electrodes Rx3 for simplifying the drawings. In a similar way, the descriptions are made by describing the nine drive electrodes Tx1a to Tx1i in a lump as drive electrodes Tx1, the nine drive electrodes Tx2a to Tx2i in a lump as drive electrodes Tx2, and the nine drive electrodes Tx3a to Tx3i in a lump as drive electrodes Tx3. The descriptions are made by describing the lead wirings (peripheral wirings) R1, R2, R3, . . . , Rn in a lump as R1, R2 to Rn. In addition, the descriptions are made by also describing the plural switching elements TRSW and plural switching elements TTSW simply as switching elements TRSW and switching elements TTSW.

First Configuration Example of Sensor Panel SPNL

FIG. 10 is a diagram used for explaining a first configuration example of the sensor panel SPNL. As shown in FIG. 10, the sensor panel SPNL includes a sensor substrate SSUB, and an active area AA and a mounting section MA2 are installed on the sensor substrate SSUB. The detection electrodes Rx1 to Rxn and the drive electrodes Tx1 to Txn are disposed in the active area AA of the sensor panel SPNL. Each of the detection electrodes Rx1 to Rxn extends in the first direction X, and the detection electrodes Rx1 to Rxn are arranged in the second direction Y different from the first direction X. Each of the drive electrodes Tx1 to Txn extends in the second direction Y, and the drive electrodes Tx1 to Txn are arranged in the first direction X. The lead wirings R1, R2 to Rn are disposed in a peripheral region in the outside of the active area AA of the sensor panel SPNL. Each of the lead wirings R1, R2 to Rn extends in the second direction Y, and the lead wirings R1, R2 to Rn are arranged in the first direction X.

The plural switching elements TRSW are disposed between the lead wirings R1, R2 to Rn and the detection electrodes Rx1 to Rxn. The plural switching elements TRSW are arranged in the second direction Y between the lead wirings R1, R2 to Rn and the detection electrode Rx1 to Rxn. The switching elements TRSW are disposed, as an example, in the peripheral region in the outside of the active area AA. Here, some of the switching elements TRSW can also be disposed in the inside of the active area AA.

The plural switching elements TTSW are disposed in the peripheral region in the outside of the active area AA of the sensor panel SPNL. Each of the plural switching elements TTSW is connected to one edge of the corresponding drive electrode of the drive electrodes Tx1 to Txn.

Plural external connection terminals EXT are arranged in the first direction X on the mounting section MA2. The plural external connection terminals EXT include plural first external connection terminals EXT1 one end of each of which is connected to the corresponding lead wiring of the lead wirings R1, R2 to Rn and plural second external connection terminals EXT2 one end of each of which is connected to the corresponding switching element of the plural switching elements TTSW. The other end of each of the first external connection terminals EXT1 is connected to the input terminal IN of the detection circuit TPSDT. The other end of each of the second external connection terminals EXT2 is connected to a drive circuit TPSTxDr.

Second Configuration Example of Sensor Panel SPNL

FIG. 11 is a diagram used for explaining a second configuration example of the sensor panel SPNL. The configuration example of the sensor panel SPNL shown in FIG. 11 is different from the configuration example of the sensor panel SPNL shown in FIG. 10 is in that, in FIG. 11, each of the detection electrodes Rx1 to Rxn extends in the second direction Y and the detection electrodes Rx1 to Rxn are arranged in the first direction that is different from the second direction Y, and each of the drive electrodes Tx1 to Txn extends in the first direction X and the drive electrodes Tx1 to Txn are arranged in the second direction Y. Herewith, each of the lead wirings R1, R2 to Rn extends in the second direction Y, and the lead wirings R1, R2 to Rn are arranged in the first direction X. The plural switching elements TRSW are arranged in the first direction X between the lead wirings R1, R2 to Rn and the detection electrodes Rx1 to Rxn. The plural external connection terminal EXT (the plural first external connection terminals EXT1 and the plural second external connection terminals EXT2) are arranged in the first direction X on the mounting section MA2.

Therefore, the arrangement direction of the plural first external connection terminals EXT1 (the first direction X) and the arrangement direction of the detection electrodes Rx1 to Rxn (the first direction X) are the same as each other in FIG. 11, but the arrangement direction of the plural first external connection terminals EXT1 (the first direction X) and the arrangement direction of the detection electrodes Rx1 to Rxn (the second direction Y) are different from each other in FIG. 10.

In this situation, if the arrangement direction of the detection electrodes Rx1 to Rxn in FIG. 11 is made the same direction (the second direction) as that in FIG. 10 by interchanging the first direction X with the second direction Y in FIG. 11, the arrangement direction of the plural first connection terminals EXT1 in FIG. 11 can be viewed as the second direction Y.

Figure 12:
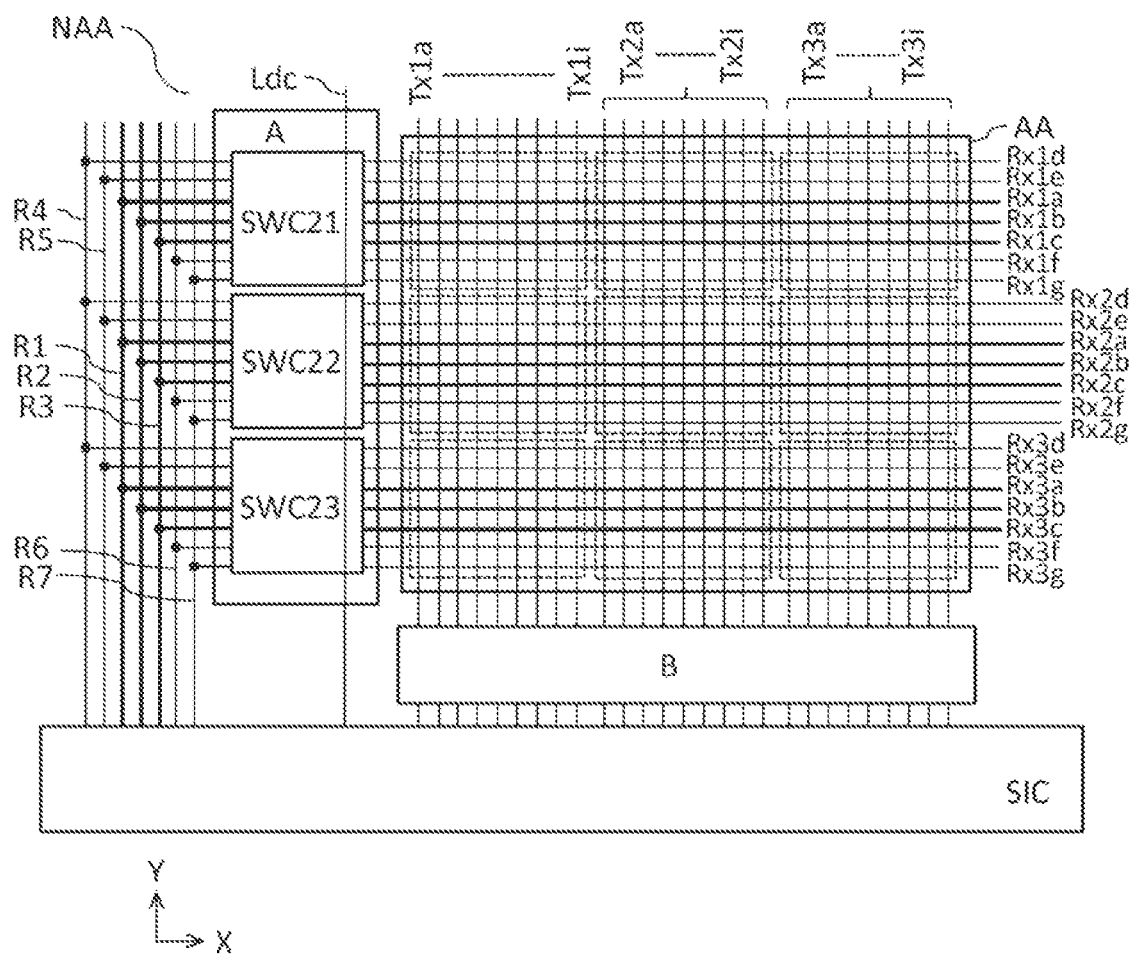
FIG. 12 is a diagram showing a configuration example of a sensor panel according to the embodiment that is capable of executing both touch detection and fingerprint detection.
Figure 13:
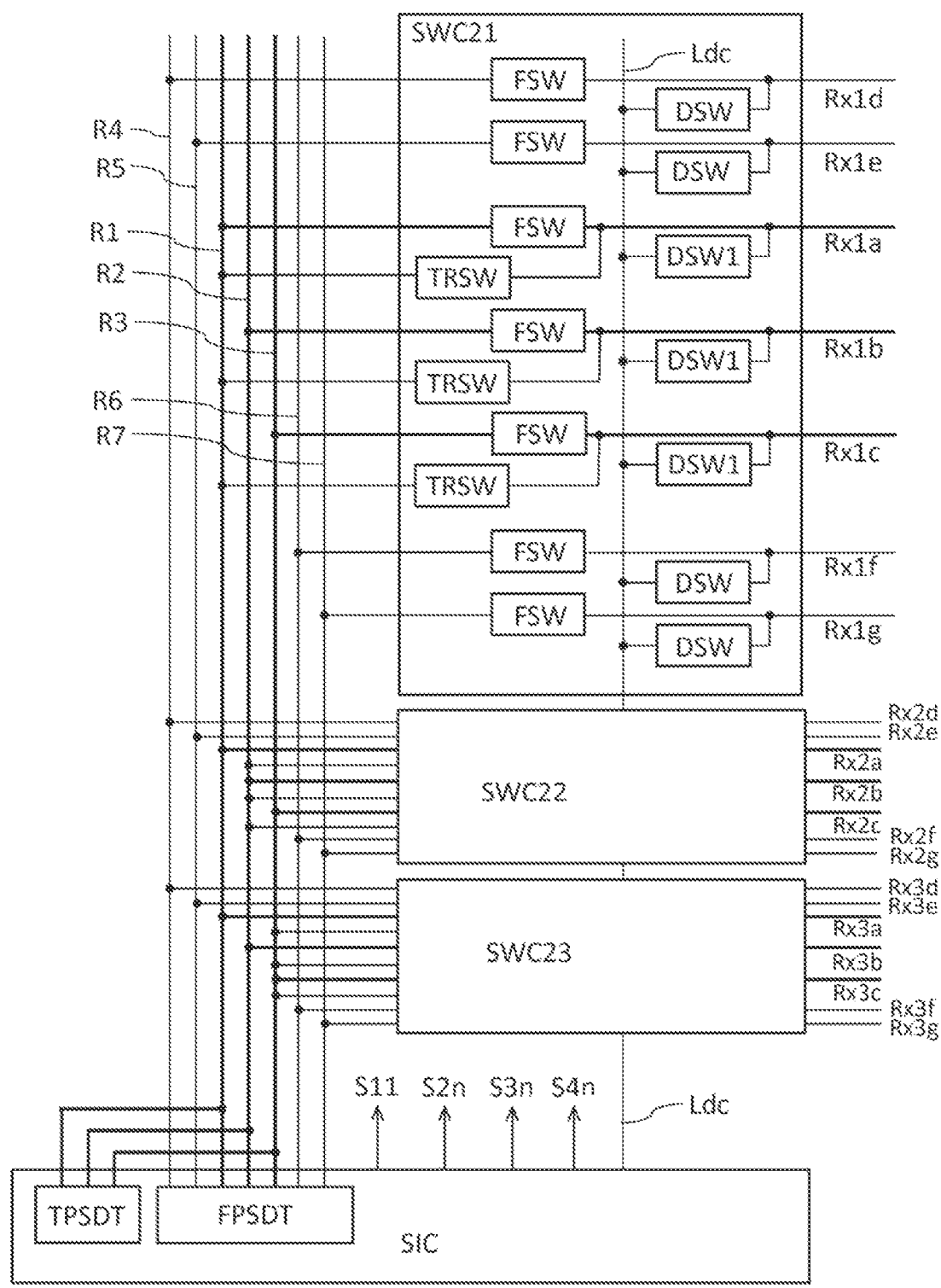
FIG. 13 is a circuit diagram showing a configuration example of a region A shown in FIG. 12.
Figure 14:
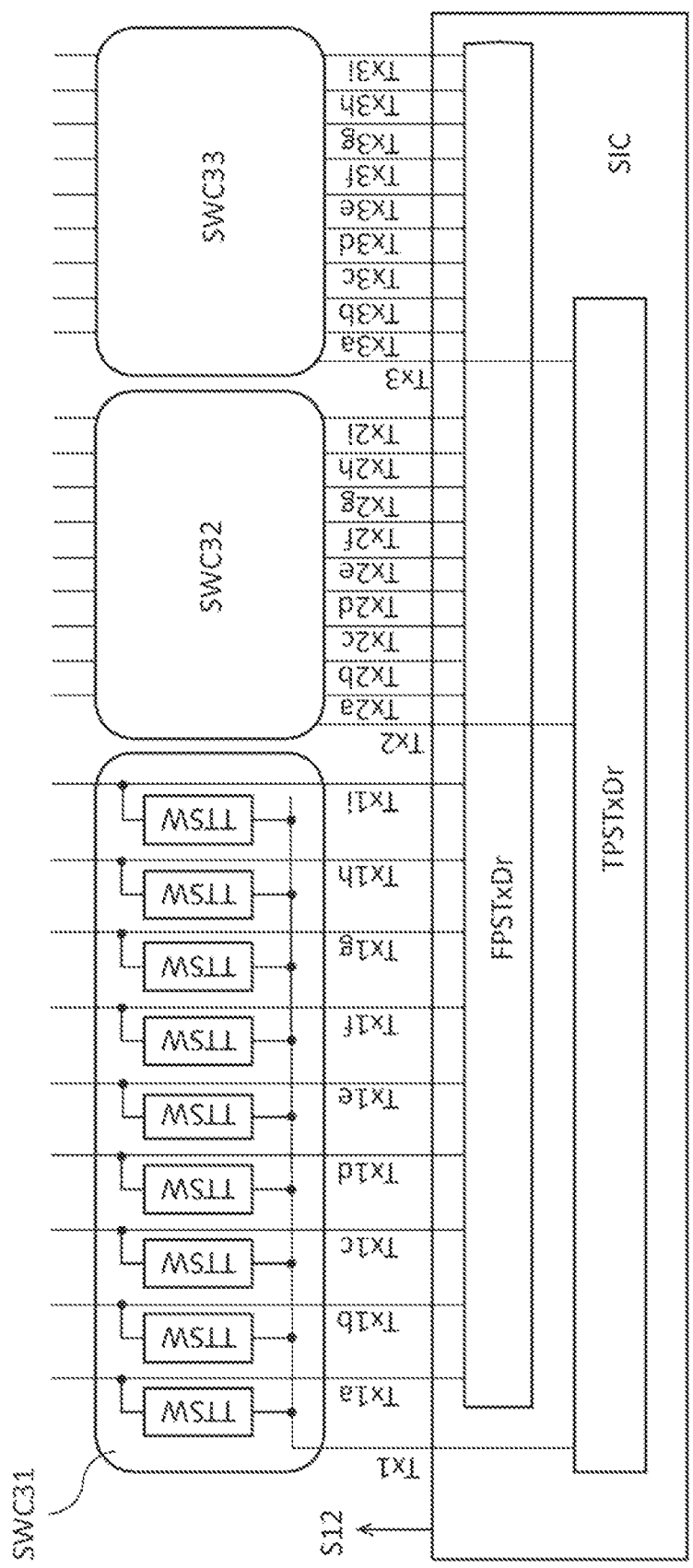
FIG. 14 is a circuit diagram showing a configuration example of a region B shown in FIG. 12.

Configuration Example of Sensor Panel Capable of Executing Both Touch Detection and Fingerprint Detection FIG. 12 is a diagram showing a configuration example of a sensor panel that is capable of executing both touch detection and fingerprint detection. FIG. 13 is a circuit diagram showing a configuration example of a region A shown in FIG. 12. FIG. 14 is a circuit diagram showing a configuration example of a region B shown in FIG. 12. The sensor panel SPNL shown in FIG. 12, FIG. 13, and FIG. 14 shows a basic configuration example of the sensor panel shown in FIG. 1. Here, although the reference signs of the touch detection nodes TN1 to TN9 shown in FIG. 4 are not depicted in FIG. 12 for avoiding the complexity of FIG. 12, the following explanations will be made using the reference signs of the touch detection nodes TN1 to TN9 shown in FIG. 4.

The touch detection nodes TN1, TN2, and TN3 are provided with plural detection electrodes each of which extends in the first direction X. As an example, the touch detection nodes TN1, TN2, and TN3 are provided with not only the three detection electrodes Rx1a, Rx1b, and Rx1c, which are illustrated in FIG. 5, but also four detection electrodes Rx1d, Rx1e, Rx1f, and Rx1g. The seven detection electrodes Rx1a to Rx1g are electrically connected to a switch circuit SWC21 mounted on the outside of the active area AA. The switch circuit SWC21 is also electrically connected to seven lead wirings R1 to R7 formed in the outside of the active area AA.

The touch detection nodes TN4, TN5, and TN6 are provided with plural detection electrodes each of which extends in the first direction X. As an example, the touch detection nodes TN4, TN5, and TN6 are provided with not only the three detection electrodes Rx2a, Rx2b, and Rx2c, which are illustrated in FIG. 5, but also four detection electrodes Rx2d, Rx2e, Rx2f, and Rx2g. The seven detection electrodes Rx2a to Rx2g are electrically connected to a switch circuit SWC22 mounted on the outside of the active area AA. The switch circuit SWC22 is also electrically connected to seven lead wirings R1 to R7 formed in the outside of the active area AA.

The touch detection nodes TN7, TN8, and TN9 are provided with plural detection electrodes each of which extends in the first direction X. As an example, the touch detection nodes TN4, TN5, and TN6 are provided with not only the three detection electrodes Rx3a, R3xb, and Rx3c, which are illustrated in FIG. 5, but also four detection electrodes Rx3d, Rx3e, Rx3f, and Rx3g. The seven detection electrodes Rx3a to Rx3g are electrically connected to a switch circuit SWC23 mounted on the outside of the active area AA. The switch circuit SWC23 is also electrically connected to seven lead wirings R1 to R7 formed in the outside of the active area AA.

The touch detection nodes TN1, TN4, and TN7 are provided with plural detection electrodes each of which extends in the second direction Y. As an example, the touch detection nodes TN1, TN4, and TN7 are provided with nine drive electrodes Tx1a to Tx1i. The touch detection nodes TN2, TN5, and TN8 are provided with plural drive electrodes each of which extends in the second direction Y. As an example, the touch detection nodes TN2, TN5, and TN8 are provided with nine drive electrodes Tx2a to Tx2i. The touch detection nodes TN3, TN6, and TN9 are provided with plural drive electrodes each of which extends in the second direction Y. As an example, the touch detection nodes TN3, TN6, and TN9 are provided with nine drive electrodes Tx3a to Tx3i.

As will be illustrated in FIG. 14, the nine drive electrodes Tx1a to Tx1i, the nine drive electrodes Tx2a to Tx2i, and the nine drive electrodes Tx3a to Tx3i are electrically connected to a drive circuit FPSTxDr of a sensor IC chip SIC used for fingerprint detection. Furthermore, as will be illustrated in FIG. 13, the seven lead wirings R1 to R7 are electrically connected to a detection circuit FPSDT of the sensor IC chip SIC used for fingerprint detection.

As shown in FIG. 12, it becomes possible to accurately detect fine concavities and convexities shown by a fingerprint or the like by making the number of detection electrodes in FIG. 12 larger than that in FIG. 5.

In FIG. 13, each of the switch circuits SW21 to SW23 includes the three switching elements TRSW illustrated in FIG. 5 as shown by the switch circuit SWC21 as a representative. The configurations of the switch circuits SWC22 and SWC23 are almost the same as that of the switch circuit SWC21, but the destination of the three switching elements TRSW of the switch circuit SWC21, that of the switch circuit SWC22, and that of the switch circuit SWC23 are different from one another as illustrated in FIG. 5. In other words, the three switching elements TRSW installed in the switch circuit SWC21 are prepared for bundling the detection electrodes Rx1a, Rx1b, and Rx1c and electrically connecting these electrodes to the lead wiring R1. The three switching elements TRSW installed in the switch circuit SWC22 are prepared for bundling the detection electrodes Rx2a, Rx2b, and Rx2c and electrically connecting these electrodes to the lead wiring R2. The three switching elements TRSW installed in the switch circuit SWC23 are prepared for bundling the detection electrodes Rx3a, Rx3b, and Rx3c and electrically connecting these electrodes to the lead wiring R3.

At the time of touch position detection, each of the switching elements TRSW is controlled so as to be in an on-state or in an off-state by a switch signal S11 of a high or low level outputted from the sensor IC chip SIC as illustrated in FIG. 5. On the other hand, at the time of fingerprint detection, each of the switching elements TRSW is set in an off-state by the switch signal S11 of a low level outputted from the sensor IC chip SIC.

Each of the switch circuits SWC21 to SWC23 includes: three switching elements DSW1 connected to detection electrodes Rxna, Rxnb, and Rxnc (n=1, 2, or 3); four switching elements DSW connected to detection electrodes Rxnd, Rxne, Rxnf, and Rxng (n=1, 2, or 3); and seven switching elements FSW that are disposed between the lead wirings R1 to R7 and the detection electrodes Rx1a to Rx1g respectively and that are connected to the lead wirings R1 to R7 and the detection electrodes Rx1a to Rx1g respectively as shown by the switch circuit SWC21 in FIG. 13 as a representative. Each of the switching elements FSW, DSW, and DSW1 can be made by, for example, a thin film transistor (TFT).

The operations of the switching elements DSW1 and the operations of the switching elements DSW are different at the time of touch position detection. At the time of fingerprint detection, the switching elements DSW1 and the switching elements DSW are set in an on-state or in an off-state at the same time. On the other hand, at the time of touch position detection, the switching elements DSW1 are set in an off-state and the switching elements DSW are set in an on-state.

The seven switching elements FSW are installed between the seven detection electrodes (Rxna to Rxng: n=1, 2, or 3) and the seven lead wirings R1 to R7. The seven switching elements FSW are controlled so as to be in an on-state or in an off-state by a switch signal S2n outputted from the sensor IC chip SIC. The switching elements FSW are set in an on-state by the switch signal S2n of a high level, and set in an off-level by the switch signal S2n of a low level. Owing to the on-states of the seven switching elements FSW, the seven detection electrodes (Rxna to Rxng: n=1, 2, or 3) and the seven lead wirings R1 to R7 are electrically connected respectively.

The switching elements DSW and DSW1 are installed between the seven detection electrodes (Rxna to Rxng: n=1, 2, or 3) and a wiring Ldc. The Ldc is supplied with a predefined DC potential VDC, for example, the ground potential (0 V). The switching elements DSW are controlled so as to be in an on-state or in an off-state by a switch signal S3$n$. The switching elements DSW are set in an on-state by the switch signal S3$n$ of a high level, and set in an off-level by the switch signal S3$n$ of a low level. The switching elements DSW1 are controlled so as to be in an on-state or in an off-state by a switch signal S4$n$. The switching elements DSW1 are set in an on-state by the switch signal S4$n$ of a high level, and set in an off-level by the switch signal S4$n$ of a low level. In the case where the switching DSW and DSW1 are in an on-state, the potentials of the seven detection electrodes (Rxna to Rxng: n=1, 2, or 3) are set to the DC potential VDC.

Next, the switching signals S2$n$, S3$n$, and S4$n$ outputted from the sensor IC chip SIC will be explained.

Of the switching signal S2$n$ (n=1, 2, and 3), the switching signal S21 (in the case of n=1) is supplied to the plural switching elements FSW of the switch circuit SWC21, the switching signal S22 (in the case of n=2) is supplied to the plural switching elements FSW of the switch circuit SWC22, and the switching signal S23 (in the case of n=3) is supplied to the plural switching elements FSW of the switch circuit SWC3.

In the case where touch detection is executed at the touch detection nodes TN1 to TN9, the plural switching elements FSW of the switch circuits SWC21, SWC22, and SWC23 are set in an off-state by the switch signals S21, S22, and S23 of a low level respectively.

In the case where fingerprint detection is executed at the touch detection nodes TN1, TN2, and TN3, the plural switching elements FSW of the switch circuit SWC21 are set in an on-state by the switch signal S21 of a high level. On the other hand, the plural switching elements FSW of the switch circuit SWC22 are set in an off-state by the switch signal S22 of a low level, and the plural switching elements FSW of the switch circuit SWC23 are set in an off-state by the switch signal S23 of a low level.

In the case where fingerprint detection is executed at the touch detection nodes TN4, TN5, and TN6, the plural switching elements FSW of the switch circuit SWC22 are set in an on-state by the switch signal S22 of a high level. On the other hand, the plural switching elements FSW of the switch circuit SWC21 are set in an off-state by the switch signal S21 of a low level, and the plural switching elements FSW of the switch circuit SWC23 are set in an off-state by the switch signal S23 of a low level.

In the case where fingerprint detection is executed at the touch detection nodes TN7, TN8, and TN9, the plural switching elements FSW of the switch circuit SWC23 are set in an on-state by the switch signal S23 of a high level. On the other hand, the plural switching elements FSW of the switch circuit SWC21 are set in an off-state by the switch signal S21 of a low level, and the plural switching elements FSW of the switch circuit SWC22 are set in an off-state by the switch signal S22 of a low level.

Of the switch signal S3$n$ (n=1, 2, or 3), the switch signal S31 (in the case of n=1) is supplied to the plural switching elements DSW of the switch circuit SWC21, the switch signal S32 (in the case of n=2) is supplied to plural switching elements DSW of the switch circuit SWC22, and the switch signal S33 (in the case of n=3) is supplied to plural switching elements DSW of the switch circuit SWC23.

Of the switch signal S4$n$ (n=1, 2, or 3), the switch signal S41 (in the case of n=1) is supplied to plural switching elements DSW1 of the switch circuit SWC21, the switch signal S42 (in the case of n=2) is supplied to plural switching elements DSW1 of the switch circuit SWC22, and the switch signal S43 (in the case of n=3) is supplied to plural switching elements DSW1 of the switch circuit SWC23.

In the case where touch detection is executed at the touch detection nodes TN1 to TN9, the plural switching elements DSW of the switch circuits SWC21, SWC22, and SWC23 are set in an on-state by the switch signals S31, S32, and S33 of a high level respectively. On the other hand, the plural switching elements DSW1 of the switch circuits SWC21, SWC22, and SWC23 are set in an off-state by the switch signals S41, S42, and S43 of a low level respectively.

In the case where fingerprint detection is executed at the touch detection nodes TN1, TN2, and TN3, the plural switching elements DSW and DSW1 of the switch circuit SWC21 are set in an off-state by the switch signals S31 and S41 of a low level respectively. On the other hand, the plural switching elements DSW and DSW1 of the switch circuits SWC22 are set in an on-state by the switch signals S32 and S42 of a high level respectively, and the plural switching elements DSW and DSW1 of the switch circuits SWC23 are set in an on-state by the switch signals S33 and S43 of a high level respectively.

In the case where fingerprint detection is executed at the touch detection nodes TN4, TN5, and TN6, the plural switching elements DSW and DSW1 of the switch circuit SWC22 are set in an off-state by the switch signals S32 and S42 of a low level respectively. On the other hand, the plural switching elements DSW and DSW1 of the switch circuits SWC21 are set in an on-state by the switch signals S31 and S41 of a high level respectively, and the plural switching elements DSW and DSW1 of the switch circuits SWC23 are set in an on-state by the switch signals S33 and S43 of a high level respectively.

In the case where fingerprint detection is executed at the touch detection nodes TN7, TN8, and TN9, the plural switching elements DSW and DSW1 of the switch circuit SWC23 are set in an off-state by the switch signals S33 and S43 of a low level respectively. On the other hand, the plural switching elements DSW and DSW1 of the switch circuits SWC21 are set in an on-state by the switch signals S31 and S41 of a high level respectively, and the plural switching elements DSW and DSW1 of the switch circuits SWC22 are set in an on-state by the switch signals S32 and S42 of a high level respectively.

A detection circuit TPSDT for touch position detection to which the lead wirings R1, R2, and R3 are electrically connected, and the detection circuit FPSDT for fingerprint detection to which the lead wirings R1 to R7 are electrically connected are installed in the sensor IC chip SIC. The detection circuit TPSDT for touch position detection is activated at the time of touch position detection and executes touch position detection. The detection circuit FPSDT for fingerprint detection is activated at the time of fingerprint detection and executes fingerprint detection.

In FIG. 14, the configurations of switch circuits SWC32 and SWC33 are almost the same as the configuration of a switch circuit SWC31. Each of the switch circuits SWC31, SWC32, and SWC33 includes the plural switching elements TTSW illustrated in FIG. 5. The plural switching elements TTSW of the switch circuit SWC31 are installed for bundling drive electrodes Tx1$a$ to Tx1$i$ and treating these drive electrodes as one drive electrode Tx1. The plural switching elements TTSW of the switch circuit SWC32 are installed for bundling drive electrodes TX2a to Tx2i and treating these drive electrodes as one drive electrode Tx2. The plural switching elements TTSW of the switch circuit SWC33 are installed for bundling drive electrodes TX3a to Tx3g and treating these drive electrodes as one drive electrode Tx3.

The on-state and off-state of each of the switching elements TTSW of the switch circuits SWC31, SWC32, and SWC33 are controlled by the switch signal S12 outputted from the sensor IC chip SIC. Each of the switching elements TTSW is set in an on-state by the high level of a switch signal S12 at the time of touch position detection and set in an off-state by the low level of the switch signal S12 at the time of fingerprint detection.

The sensor IC chip SIC includes a drive circuit TPSTxDr for touch position detection and the drive circuit FPSTxDr for fingerprint detection. The drive electrodes Tx1 to Tx3 are electrically connected to the drive circuit TPSTxDr for touch position detection. The drive electrodes Tx1a to Tx1i, Tx2a to Tx2i, and Tx3a to Tx3i are electrically connected to the drive circuit FPSTxDr for fingerprint detection. In addition, the output impedance of the drive circuit FPSTxDr for fingerprint detection becomes a high impedance at the time of touch position detection.

(Behavior of Sensor Panel SPNL)

Figure 15:
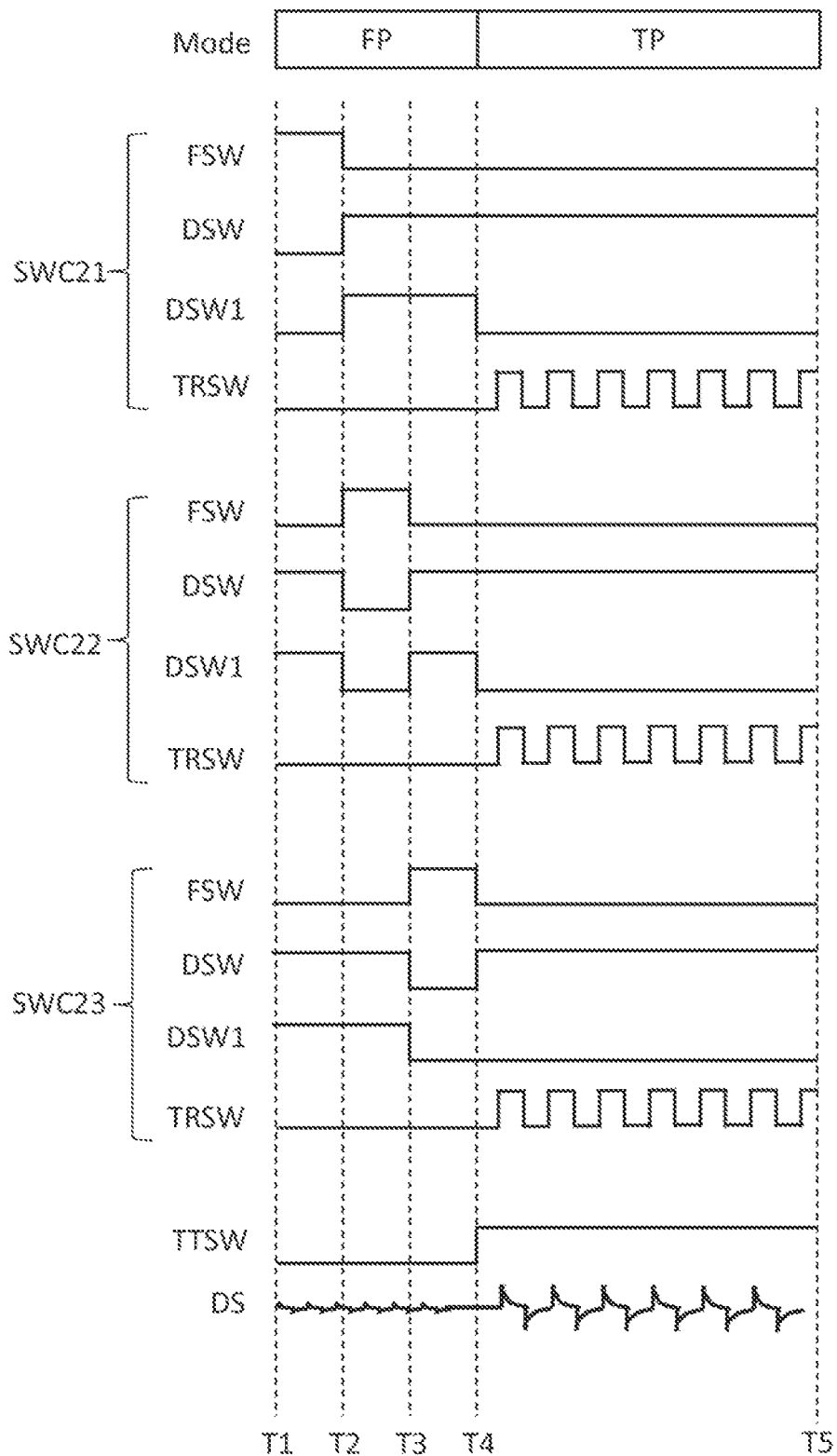
FIG. 15 is a waveform chart used for explaining the behavior of the sensor panel shown in FIG. 12.

Next, the behavior of the sensor panel SPNL will be explained using FIG. 15. FIG. 15 is a waveform chart used for explaining the behavior of the sensor panel SPNL. The sensor mode of the sensor panel SPNL includes a fingerprint detection mode FP and a touch detection mode TP. FIG. 15 shows the behavior of the sensor panel SPNL in which fingerprint detection is executed in the fingerprint detection mode FP first and the mode of the sensor panel SPNL shifts from the fingerprint detection mode FP to the touch detection mode TP and touch detection is executed next.

(Fingerprint Detection Mode FP)

A period between the time T1 and the time T4 is a period of the fingerprint detection mode FP, and a period between the time T4 and the time T5 is a period of the touch detection mode TP. It will be assumed that, in the fingerprint detection mode FP, fingerprint detection at touch detection nodes TN1, TN2, and TN3 is executed first, fingerprint detection at touch detection nodes TN4, TN5, and TN6 is executed next, and fingerprint detection at touch detection nodes TN7, TN8, and TN9 is executed finally. In an actual sensor panel SPNL, because plural touch detection nodes the number of which is nine or more is installed in the active area AA, fingerprint detection can be executed using a partial region of the active area AA such as the upper portion or the lower portion of the active area AA. In other words, although fingerprint detection can be executed using the entirety of the active area AA, it is not always necessary that the fingerprint detection should be executed using the entirety of the active area AA.

During a period between the time T1 and the time T2, fingerprint detection at the touch detection nodes TN1, TN2, and TN3 is executed. In the switch circuit SWC21, the switching elements FSW are set in an on-state, and the switching elements DSW, DSW1, and TRSW are set in an off-state. In the switch circuits SWC22 and SWC23, the switching elements FSW and TRSW are set in an off-state, and the switching elements DSW and DSW1 are set in an on-state. Furthermore, the switching elements TTSW of the switch circuits SWC31 to SWC33 are set in an off-state. In the above condition, each of the drive electrodes Tx1a to Tx1i, Tx2a to Tx2i, and Tx3a to Tx3i is sequentially driven (scanned) with a drive pulse Sig2 at a predefined cycle by the drive circuit FPSTxDr for fingerprint detection. With this, detection signals DS at the seven electrodes Rx1a to Rx1g installed at the touch detection nodes TN1, TN2, and TN3 are outputted to the lead wirings R1 to R7 respectively, and input into the detection circuit FPSDT.

During a period between the time T2 and the time T3, the fingerprint detection at the touch detection nodes TN4, TN5, and TN6 is executed. In the switch circuit SWC22, the switching elements FSW are set in an on-state, and the switching elements DSW, DSW1, and TRSW are set in an off-state. In the switch circuits SWC21 and SWC23, the switching elements FSW and TRSW are set in an off-state, and the switching elements DSW and DSW1 are set in an on-state. Furthermore, the switching elements TTSW of the switch circuits SWC31 to SWC33 are set in an off-state. In the above condition, each of the drive electrodes Tx1a to Tx1i, Tx2a to Tx2i, and Tx3a to Tx3i is sequentially driven (scanned) with the drive pulse Sig2 at a predefined cycle by the drive circuit FPSTxDr for fingerprint detection. With this, detection signals DS at the seven electrodes Rx2a to Rx2g installed at the touch detection nodes TN4, TN5, and TN6 are outputted to the lead wirings R1 to R7 respectively, and inputted into the detection circuit FPSDT.

During a period between the time T3 and the time T4, the fingerprint detection at the touch detection nodes TN7, TN8, and TN9 is executed. In the switch circuit SWC23, the switching elements FSW are set in an on-state, and the switching elements DSW, DSW1, and TRSW are set in an off-state. In the switch circuits SWC21 and SWC22, the switching elements FSW and TRSW are set in an off-state, and the switching elements DSW are set in an on-state. Furthermore, the switching elements TTSW of the switch circuits SWC31 to SWC33 are set in an off-state. In the above condition, each of the drive electrodes Tx1a to Tx1i, Tx2a to Tx2i, and Tx3a to Tx3i is sequentially driven (scanned) with the drive pulse Sig2 at a predefined cycle by the drive circuit FPSTxDr for fingerprint detection. With this, detection signals DS at the seven electrodes Rx3a to Rx3g installed at the touch detection nodes TN7, TN8, and TN9 are outputted to the lead wirings R1 to R7 respectively, and inputted into the detection circuit FPSDT.

(Touch Detection Mode TP)

Figure 16:
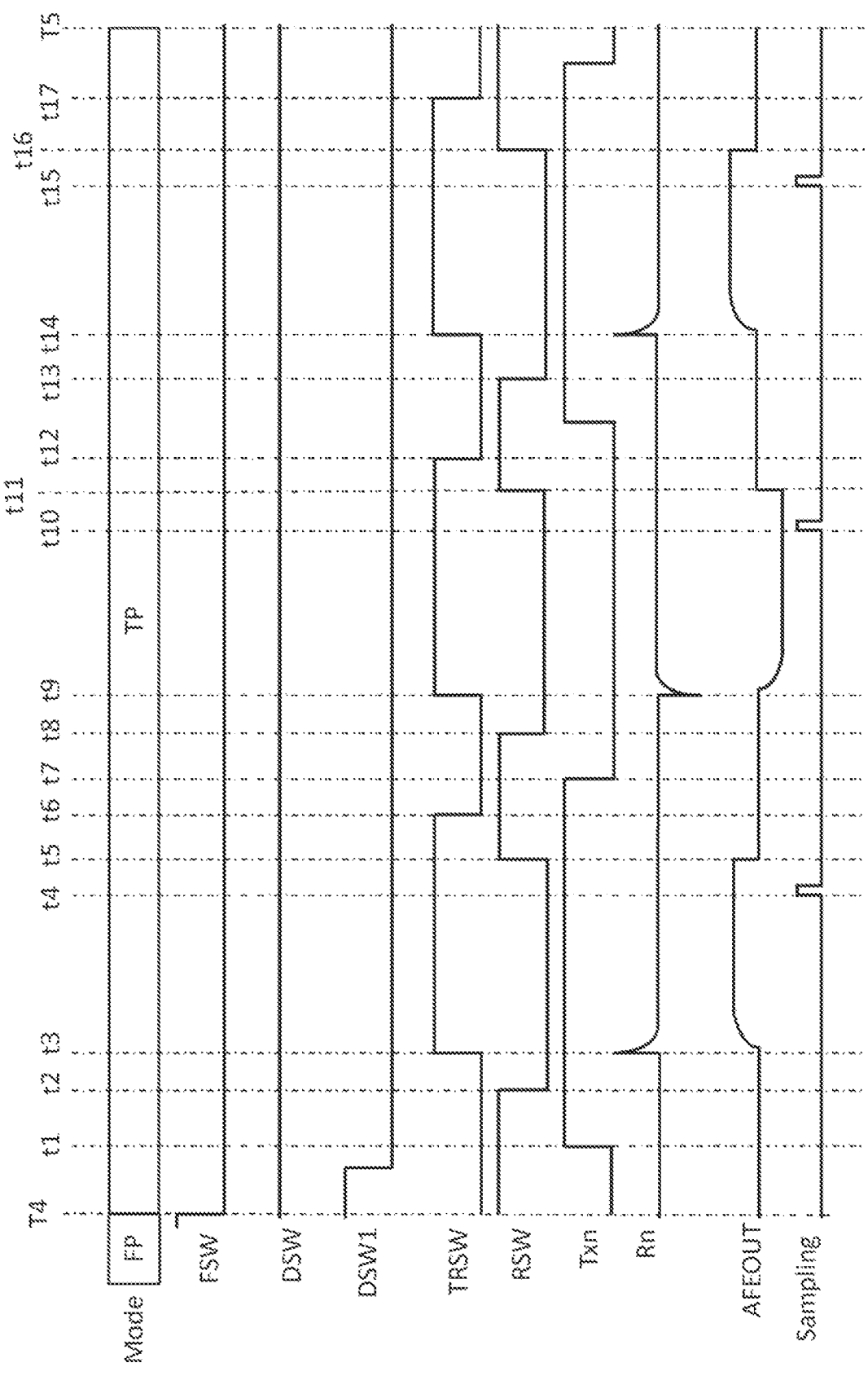
FIG. 16 is a waveform chart showing a touch detection mode in FIG. 15 in detail.

During a period between the time T4 and the time T5, touch detection at the touch detection nodes TN1 to TN9 is executed. In the switch circuits SWC21, SWC22, and SWC23, the switching elements FSW and DSW1 are set in an off-state, the switching elements DSW are set in an on-state, and the switching elements TRSW are set in an on-state or in an off-state. Furthermore, the switching elements TTSW of the switch circuits SWC31 to SWC33 are set in an on-state. FIG. 16 is a waveform chart showing the touch detection mode TP in detail. Although the waveforms of the switching elements FSW, DSW, and DSW1 are shown in FIG. 16, the waveforms of other signals (TRSW, RSW, Tnx, Rn, AFEOUT, and sampling) at the times t1 to t17 between the times T4 and T5 in FIG. 16 are the same as those at the times t1 to t17 in FIG. 9, therefore redundant descriptions thereof will be omitted.

According to the embodiment, the effect brought about by couplings between the outermost drive wirings Tx1 and the lead wirings R1, R2, and R3 can be eliminated, therefore the accuracy of touch detection can be improved.

All kinds of display devices and touch panels that can be obtained by those skilled in the art through appropriately modifying designs based on the display device and touch panel described above as the embodiment of the present invention fall within the scope of the present invention as long as all the kinds of display devices and touch panels do not deviate from the gist of the present invention.

It should be understood that, if various alternation examples and modification examples are easily conceived by those skilled in the art within the category of the idea of the present invention, those alternation examples and modification examples also fall within the scope of the present invention. For example, devices obtained in the case where those skilled in the art appropriately add components to the above-described embodiment, delete components from the above-described embodiment, add processes to original processes for the above-described embodiment, omit processes from the original processes, or alter conditions for implementing the above-described embodiment fall within the scope of the present invention as long as the devices do not deviate from the gist of the present invention.

In addition, it should be obviously understood that other operational effects, which are brought about by this embodiment, clear from the descriptions of the present specification, and can be accordingly conceived by those skilled in the art, are brought about by the above-described invention.

Various inventions can be achieved by appropriately combining plural components disclosed in the above-described embodiment. For example, a new invention will be achieved by deleting some components from all the components included in the embodiment. Alternatively, another new invention will be achieved by appropriately combining components from the above-described embodiment.

What is claimed is:

1. A display device comprising:
    a first substrate having a first area and a second area;
    a second substrate facing the first area, and not facing the second area;
    a plurality of detection electrodes extending in a first direction and being arranged in a second direction crossing the first direction, and each of the detection electrodes being arranged in the first area;
    a plurality of first switching elements arranged in the first area;
    a plurality of terminals arranged in the first area; and
    a detection circuit;
    wherein each of the first switching elements being electrically connected between each of the detection electrodes and each of the terminals, and each of the terminals being electrically connected to the detection circuit,
    wherein each of the detection electrodes includes a plurality of sub-detection electrodes each of which being electrically connected to each of the first switching elements, and
    wherein each of the first switching elements comprising:
    a reference voltage line;
    a plurality of a first sub-switching elements electrically connected between each of the sub-detection electrodes and the reference voltage line; and
    a plurality of a second sub-switching elements electrically connected between each of the sub-detection electrodes and the detection circuit.

2. The display device according to claim 1 further comprising:
    a plurality of driving electrodes extending in the second direction and being arranged in the first direction, and each of the driving electrodes being arranged in the first area;
    a plurality of second switching elements arranged in the first area;
    a plurality of second terminals arranged in the second area; and
    a driving circuit;
    wherein each of the second switching elements being electrically connected between each of the driving electrodes and each of the second terminals, and each of the second terminals being electrically connected to the driving circuit.

3. The display device according to claim 1, further comprising:
    a plurality of third sub-switching elements to bundle a part of the sub-detection electrodes.

4. The display device according to claim 2, wherein,
    each of the driving electrodes includes a plurality of sub-driving electrodes.

5. The display device according to claim 4, further comprising:
    a plurality of fourth sub-switching elements to bundle sub-driving electrodes.

6. The display device according to claim 5, wherein the plurality of terminals and second terminals being arranged in the first direction.

7. The display device according to claim 5, wherein the plurality of terminals and second terminals are arranged in the second direction.

8. A touch panel comprising:
    a substrate having a first area to detect an external object and a second area surrounding the first area;
    a plurality of detection electrodes extending in a first direction and being arranged in a second direction crossing the first direction, and each of the detection electrodes being arranged in the first area;
    a plurality of first switching elements facing the first area;
    a plurality of terminals facing the second area;
    a detection circuit;
    wherein each of the first switching elements being electrically connected between each of the detection electrodes and each of the terminals, and each of the terminals being electrically connected to the detection circuit,
    wherein each of the detection electrodes includes a plurality of sub-detection electrodes each of which being electrically connected to each of the first switching elements, and
    wherein each of the first switching elements comprising:
    a reference voltage line;
    a plurality of a first sub-switching elements electrically connected between each of the sub-detection electrodes and the reference voltage line; and
    a plurality of a second sub-switching elements electrically connected between each of the sub-detection electrodes and the detection circuit.

9. The touch panel according to claim 8 further comprising:
    a plurality of driving electrodes extending in the second direction and being arranged in the first direction, and each of the driving electrodes being arranged in the first area;
    a plurality of second switching elements facing the first area;
    a plurality of second terminals facing the second area;
    a driving circuit;
    wherein each of the second switching elements being electrically connected between each of the driving electrodes and each of the second terminals, and each of the second terminals being electrically connected to the driving circuit.

10. The touch panel according to claim 8, further comprising:
   a plurality of third sub-switching elements to bundle a part of the sub-detection electrodes.

11. The touch panel according to claim 9, wherein each of the driving electrodes includes a plurality of sub-driving electrodes.

12. The touch panel according to claim 11, further comprising:
   a plurality of fourth sub-switching elements to bundle sub-driving electrodes.

13. The touch panel according to claim 12, wherein the plurality of terminals and second terminals being arranged in the first direction.

14. The d touch panel according to claim 12, wherein the plurality of terminals and second terminals are arranged in the second direction.

\* \* \* \* \*